(12) United States Patent
Yuza

(10) Patent No.: US 9,417,432 B2
(45) Date of Patent: Aug. 16, 2016

(54) IMAGING LENS

(71) Applicant: KANTATSU CO., LTD., Yaita-shi, Tochigi (JP)

(72) Inventor: Shingo Yuza, Sukagawa (JP)

(73) Assignee: KANTATSU CO., LTD., Yaita-shi (JP)

(*) Notice: Subject to any disclaimer, the term of this patent is extended or adjusted under 35 U.S.C. 154(b) by 0 days.

(21) Appl. No.: 14/533,504

(22) Filed: Nov. 5, 2014

(65) Prior Publication Data

US 2015/0323763 A1 Nov. 12, 2015

(30) Foreign Application Priority Data

May 12, 2014 (JP) .................................. 2014-098457

(51) Int. Cl.
G02B 13/18 (2006.01)
G02B 13/00 (2006.01)
G02B 13/06 (2006.01)

(52) U.S. Cl.
CPC ............ G02B 13/0045 (2013.01); G02B 13/06 (2013.01); G02B 13/18 (2013.01)

(58) Field of Classification Search
CPC ...... G02B 13/18; G02B 9/60; G02B 13/0045; G02B 13/06; G02B 13/16
See application file for complete search history.

(56) References Cited

U.S. PATENT DOCUMENTS

| 8,873,165 B1 | 10/2014 | Chung et al. | |
| 2013/0188263 A1* | 7/2013 | Tsai | G02B 13/0045 359/714 |
| 2013/0242412 A1 | 9/2013 | Uchida et al. | |
| 2014/0139698 A1 | 5/2014 | Fukuta et al. | |
| 2014/0177076 A1 | 6/2014 | Hsu et al. | |
| 2015/0009392 A1 | 1/2015 | Chiang et al. | |
| 2015/0085386 A1 | 3/2015 | Tanaka et al. | |
| 2015/0198789 A1 | 7/2015 | Tanaka | |

FOREIGN PATENT DOCUMENTS

| JP | 2011-141396 A | 7/2011 |
| JP | 2012-103717 A | 5/2012 |
| JP | 2013-182090 A | 9/2013 |

* cited by examiner

*Primary Examiner* — Scott J Sugarman
*Assistant Examiner* — Vipin Patel
(74) *Attorney, Agent, or Firm* — Westerman, Hattori, Daniels & Adrian, LLP

(57) ABSTRACT

An imaging lens includes, in order from an object side, a first positive lens having a convex object-side surface, a second negative lens having a concave image-side surface, a third positive double-sided aspheric lens, a fourth positive lens having a convex image-side surface, and a fifth negative double-sided aspheric lens having a concave image-side surface, wherein the fifth lens image-side surface has pole-change points off an optical axis; and conditional expressions below are satisfied:

$0.80 < ih/f < 1.00$ (1)

$0.6 < TTL/2ih < 0.75$ (2)

$2.3 < f3/f < 10.3$ (3)

$0.5 < f1/f4 < 1.4$ (4)

where f denotes focal length of the imaging lens overall optical system, f1, f3 and f4 denote focal lengths of the first, third and fourth lenses respectively, ih denotes maximum image height, and TTL denotes distance on the optical axis from the first lens object-side surface to the image plane.

18 Claims, 18 Drawing Sheets

IMAGING LENS

The present application is based on and claims priority of Japanese patent application No. 2014-098457 filed on May 12, 2014, the entire contents of which are hereby incorporated by reference.

BACKGROUND OF THE INVENTION

1. Field of the Invention

The present invention relates to an imaging lens which forms an image of an object on a solid-state image sensor such as a CCD sensor or a C-MOS sensor used in a compact image pickup device, and more particularly to an imaging lens which is built in image pickup devices mounted in increasingly compact and low-profile smartphones and mobile phones, PDAs (Personal Digital Assistants), game consoles, information terminals such as PCs, and home appliances with a camera function.

2. Description of the Related Art

In recent years, there has been a general tendency that many information terminals have a camera function. Also, many kinds of home appliances with a camera function which provide high consumer convenience have been introduced into the market. It is expected that in the future the demand for home appliances or information terminals combined with a camera function will grow and products which meet the demand will be developed at an accelerated pace.

The imaging lens built in such products is strongly expected to not only provide high resolution to cope with an increase in the number of pixels but also be compact and low-profile enough to meet the trend toward low-profile products and offer high brightness and a wide field of view to capture an image of an object over a wide range.

However, when an imaging lens meets all the needs for a low-profile design, a low F-value, and a wide field of view, the following problem often arises: it is difficult to correct aberrations especially in the peripheral area of the image, and high optical performance cannot be ensured throughout the image. For this reason, it is difficult to provide an imaging lens which meets the needs for a low-profile design, a low F-value, and a wide field of view and at the same time delivers high resolution performance.

Conventionally, for example, the imaging lenses described in JP-A-2011-141396 (Patent Document 1) and JP-A-2012-103717 (Patent Document 2) are known as imaging lenses designed to deliver high resolution performance.

Patent Document 1 discloses an imaging lens which includes, in order from an object side, a first lens with positive refractive power, a second lens with negative refractive power, a biconvex third lens, a meniscus fourth lens having a convex surface on an image side, a fifth lens in which negative refractive power gradually decreases in the direction from the center toward the peripheral portion and changes to positive refractive power in the peripheral portion.

Patent Document 2 discloses a single-focus optical system which includes, in order from an object side, a first group composed of a first lens with positive refractive power having a convex surface on the object side and a second lens with negative refractive power having an aspheric surface and a concave surface on an image side, a second group composed of a third lens having an aspheric surface, and a third group composed of a fourth lens having a convex surface on the image side and a fifth lens with negative refractive power having an aspheric surface with inflection points and a concave surface on the image side.

The imaging lens described in Patent Document 1 is a relatively compact imaging lens which provides high brightness with an F-value of about 2.0 and corrects aberrations properly. However, its field of view is about 60 degrees and the ratio of total track length to maximum image height (TTL/2ih) is approximately 1.0, which is not enough to meet the recent demand for a wide field of view and low-profileness.

The imaging lens described in Patent Document 2 provides a field of view of about 76 degrees and the ratio of total track length to maximum image height (TTL/2ih) is in the range from 0.8 to 0.9. Thus it is low-profile and provides a relatively wide field of view and corrects various aberrations properly. However, its F-value is about 2.8, so its brightness is not sufficient to cope with a compact high-pixel image sensor. Also, when the imaging lens is designed to provide a wider field of view and a lower profile with high brightness, the problem that aberrations in the peripheral area are hard to correct must be solved.

SUMMARY OF THE INVENTION

The present invention has been made in view of the above problems and an object thereof is to provide a compact high-resolution imaging lens which meets the demand for low-profileness, offers high brightness with an F-value of 2.4 or less and a wide field of view and corrects various aberrations properly.

According to one aspect of the present invention, there is provided an imaging lens which forms an image of an object on a solid-state image sensor, in which the F-value is 2.4 or less and elements are arranged in the following order from an object side to an image side: a first lens with positive refractive power having a convex surface on the object side; a second lens with negative refractive power having a concave surface on the image side; a third lens with positive refractive power as a double-sided aspheric lens; a fourth lens with positive refractive power having a convex surface on the image side; and a fifth lens with negative refractive power as a double-sided aspheric lens having a concave surface on the image side. The image-side surface of the fifth lens has pole-change points off the optical axis and the imaging lens satisfies conditional expressions (1), (2), (3) and (4) below:

$$0.80 < ih/f < 1.00 \tag{1}$$

$$0.6 < TTL/2ih < 0.75 \tag{2}$$

$$2.3 < f3/f < 10.3 \tag{3}$$

$$0.5 < f1/f4 < 1.4 \tag{4}$$

where f denotes the focal length of the overall optical system of the imaging lens, f1 denotes the focal length of the first lens, f3 denotes the focal length of the third lens, f4 denotes the focal length of the fourth lens, ih denotes the maximum image height, and TTL denotes the distance on the optical axis from the object-side surface of the first lens to the image plane (air-converted length for the filter).

The imaging lens according to the present invention includes, in order from the object side, a lens group with positive composite refractive power including the first lens and the second lens, a lens group with positive composite refractive power including the third lens and the fourth lens, and the fifth lens with negative refractive power, making up a so-called telephoto lens system. This configuration is advantageous in shortening the total track length.

In the above configuration, the positive lens group composed of the first and second lenses contributes to the low-profileness and wide field of view of the imaging lens and proper correction of chromatic aberrations. The first lens is a lens with positive refractive power having a convex surface on the object side and its strong positive refractive power makes it possible that the imaging lens is low-profile and provides a wide field of view. The second lens is a lens with negative refractive power having a concave surface on the image side and properly corrects chromatic aberrations which occur on the first lens.

The positive lens group composed of the third and fourth lenses contributes to the low-profileness and wide field of view of the imaging lens and proper correction of various aberrations. The third lens has the weakest positive refractive power among the constituent lenses of the imaging lens. It gives additional positive refractive power to the imaging lens to ensure low-profileness and its both aspheric surfaces correct spherical aberrations which occur on the first and second lenses. The fourth lens is a lens with positive refractive power having a convex surface on the image side and its positive refractive power is appropriately balanced with the positive refractive power of the first lens to contribute to the low-profileness and wide field of view of the imaging lens. Also, it corrects spherical aberrations, astigmatism, and distortion properly.

The fifth lens is a lens with negative refractive power having a concave surface on the image side and ensures an appropriate back focus. It has aspheric shapes on the both surfaces and the image-side surface has pole-change points off the optical axis so that astigmatism, distortion, and field curvature are corrected properly and the angle of a chief ray incident on the image sensor is controlled effectively.

The conditional expression (1) defines an appropriate range for the ratio of maximum image height (ih) to the focal length of the overall optical system representing an imaging field of view. If the value is above the upper limit of the conditional expression (1), the field of view would be too wide to correct aberrations properly, leading to deterioration in optical performance. On the other hand, if the value is below the lower limit of the conditional expression (1), it would be impossible to provide a wide field of view, though aberrations would be corrected easily, leading to improvement in optical performance.

The conditional expression (2) defines an appropriate range for the ratio of total track length to maximum image height. If the value is above the upper limit of the conditional expression (2), the design freedom in lens shape would increase, permitting proper correction of aberrations. However, the total track length would be too long to meet demand for low-profileness. If the value is below the lower limit of the conditional expression (2), the total track length would be too short and space available for the constituent lenses would be too small for each constituent lens to have an appropriate thickness, consequently leading to a decline in manufacturing yield. Furthermore, the design freedom in lens shape would decrease, making it difficult to correct various aberrations properly. When the conditional expression (2) is satisfied, various aberrations are corrected properly and the recent demand for low-profileness is met.

The conditional expression (3) defines an appropriate range for the ratio of the focal length of the third lens to the focal length of the overall optical system, and indicates a condition to ensure low-profileness of the imaging lens and correct astigmatic difference and spherical aberrations. If the value is above the upper limit of the conditional expression (3), the positive refractive power of the third lens would be weaker and the overall positive refractive power of the imaging lens would be weaker, which would be disadvantageous in ensuring low-profileness. Furthermore, it would be advantageous in suppressing spherical aberrations but the tangential image surface in the image peripheral area would shift toward the object side, resulting in increased astigmatic difference. On the other hand, if the value is below the lower limit of the conditional expression (3), the positive refractive power of the third lens would be stronger and the overall positive refractive power of the imaging lens would be stronger, which would be advantageous in ensuring low-profileness. However, it would be difficult to suppress spherical aberrations and the tangential image surface in the image peripheral area would shift toward the image side, resulting in increased astigmatic difference.

The conditional expression (4) defines an appropriate range for the ratio of the focal length of the first lens to the focal length of the fourth lens, and indicates a condition to balance the positive refractive power between these lenses appropriately in order to suppress various aberrations and ensure that the imaging lens is low-profile and provides a wide field of view. Regarding the relation in positive refractive power between the first and fourth lenses, if the value is above the upper limit of the conditional expression (4), the refractive power of the first lens would be relatively too strong with respect to the refractive power of the first lens. In this case, the refractive power of the first lens would be relatively weak and it would be effective in suppressing spherical aberrations which occur on the first lens, but undesirably over-correction of spherical aberrations on the fourth lens would occur (increase in the positive direction) and astigmatism and distortion which occur on the fourth lens would increase. Furthermore, the positive refractive power of the first lens would be weaker, which would be disadvantageous in ensuring that the imaging lens is low-profile and provides a wide field of view. On the other hand, if the ratio in positive refractive power between the first and fourth lenses is lower than the lower limit of the conditional expression (4), the refractive power of the first lens would be relatively too strong with respect to the refractive power of the fourth lens. In this case, it would be advantageous in ensuring that the imaging lens is low-profile and provides a wide field of view. In addition, the refractive power of the fourth lens would be relatively weak, which would be advantageous in suppressing astigmatism and distortion. However, spherical aberrations which occur on the first lens would increase, and undesirably under-correction of spherical aberrations would occur (increase in the negative direction). When the conditional expression (4) is satisfied, high optical performance is delivered.

In the present invention, in terms of lens surface shape, a convex surface and a concave surface refer to paraxial shapes (shapes near the optical axis). A "pole-change point" on an aspheric surface here means a point on an aspheric surface at which a tangential plane intersects the optical axis perpendicularly.

In the imaging lens according to the present invention, preferably the fourth lens has an aspheric surface in which a remoter portion from the optical axis has weaker positive refractive power and the positive refractive power changes to negative refractive power in the peripheral portion.

This aspheric shape makes it easy to control off-axial rays and corrects spherical aberrations, distortion and astigmatism more properly and suppresses decrease in the amount of light in the peripheral portion. In addition, it makes it easy for off-axial rays to enter the fifth lens at an appropriate angle, thereby reducing the burden on the fifth lens for control of the angle of a chief ray incident on the image sensor.

Preferably, the imaging lens according to the present invention satisfies a conditional expression (5) below:

$$0.5 < f1/f < 1.0 \tag{5}$$

where f denotes the focal length of the overall optical system of the imaging lens and f1 denotes the focal length of the first lens.

The conditional expression (5) defines an appropriate range for the ratio of the focal length of the first lens to the focal length of the overall optical system, and indicates a condition to suppress spherical aberrations and ensure that the imaging lens is low-profile and provides a wide field of view. If the value is above the upper limit of the conditional expression (5), the positive refractive power of the first lens would be too weak to ensure that the imaging lens is low-profile and provides a wide field of view, though it would be effective in suppressing spherical aberrations. On the other hand, if the value is below the lower limit of the conditional expression (5), the positive refractive power of the first lens would be too strong and spherical aberrations would increase, though it would be advantageous in ensuring that the imaging lens is low-profile and provides a wide field of view. Furthermore, the lens surface curvature factor would increase, leading to increase in manufacturing error sensitivity.

Preferably, the imaging lens according to the present invention satisfies a conditional expression (6) below:

$$-1.6 < f2/f < -0.6 \tag{6}$$

where f denotes the focal length of the overall optical system of the imaging lens and f2 denotes the focal length of the second lens.

The conditional expression (6) defines an appropriate range for the ratio of the focal length of the second lens to the focal length of the overall optical system, and indicates a condition to make the imaging lens low-profile and at the same time correct chromatic aberrations properly. If the value is above the upper limit of the conditional expression (6), the negative refractive power of the second lens would be too strong to make the imaging lens low-profile and over-correction of chromatic aberrations would occur (increase in the positive direction at shorter wavelengths than the reference wavelength). Undesirably this would also cause increase in manufacturing error sensitivity. On the other hand, if the value is below the lower limit of the conditional expression (6), the negative refractive power of the second lens would be too weak and under-correction of chromatic aberrations would occur (increase in the negative direction at shorter wavelengths than the reference wavelength) though it would be advantageous in making the imaging lens low-profile.

Preferably, the imaging lens according to the present invention satisfies a conditional expression (7) below:

$$25 < vd1 - vd2 < 40 \tag{7}$$

where vd1 denotes the Abbe number of the first lens at d-ray and vd2 denotes the Abbe number of the second lens at d-ray.

The conditional expression (7) defines an appropriate range for the difference between the Abbe numbers of the first lens and the second lens at d-ray, and indicates a condition to correct chromatic aberrations properly. When a material which satisfies the conditional expression (7) is used, chromatic aberrations are corrected properly.

Preferably, the imaging lens according to the present invention satisfies a conditional expression (8) below:

$$-0.9 < f5/f < -0.4 \tag{8}$$

where f denotes the focal length of the overall optical system of the imaging lens and f5 denotes the focal length of the fifth lens.

The conditional expression (8) defines an appropriate range for the ratio of the focal length of the fifth lens to the focal length of the overall optical system, and indicates a condition to make the imaging lens low-profile and ensure an appropriate back focus. If the value is above the upper limit of the conditional expression (8), the negative refractive power of the fifth lens would be too strong and the back focus would be longer, which would be disadvantageous in making the imaging lens low-profile. On the other hand, if the value is below the lower limit of the conditional expression (8), the negative refractive power of the fifth lens would be too weak and the back focus would be shorter, making it difficult to provide space for a filter or the like, thought it would be advantageous in making the imaging lens low-profile.

Preferably, the imaging lens according to the present invention satisfies a conditional expression (9) below:

$$-1.4 < (r1+r2)/(r1-r2) < -0.3 \tag{9}$$

where r1 denotes the curvature radius of the object-side surface of the first lens and r2 denotes the curvature radius of the image-side surface of the first lens.

The conditional expression (9) defines an appropriate range for the relation between the curvature radii of the first lens representing the paraxial shape of the first lens, and indicates a condition to suppress spherical aberrations. When the value is below the upper limit of the conditional expression (9) and above its lower limit (the lens shape varies from biconvex to meniscus), spherical aberrations which occur on the first lens are corrected properly.

Preferably, the imaging lens according to the present invention satisfies a conditional expression (10) below:

$$0.75 < (r3+r4)/(r3-r4) < 3.0 \tag{10}$$

where r3 denotes the curvature radius of the object-side surface of the second lens and r4 denotes the curvature radius of the image-side surface of the second lens.

The conditional expression (10) defines an appropriate range for the relation between the curvature radii of the second lens representing the paraxial shape of the second lens and indicates a condition to correct chromatic aberrations properly. When the value is below the upper limit of the conditional expression (10) and above its lower limit (the lens shape varies from meniscus to biconcave), chromatic aberrations which occur on the first lens are corrected properly.

Preferably, the imaging lens according to the present invention satisfies a conditional expression (11) below:

$$0.7 < (r7+r8)/(r7-r8) < 1.8 \tag{11}$$

where r7 denotes the curvature radius of the object-side surface of the fourth lens and r8 denotes the curvature radius of the image-side surface of the fourth lens.

The conditional expression (11) defines an appropriate range for the relation between the curvature radii of the fourth lens representing the paraxial shape of the fourth lens, and indicates a condition to make the imaging lens low-profile and suppress various aberrations. When the value is below the upper limit of the conditional expression (11) and above its lower limit (the lens shape varies from meniscus to biconvex), the refractive power of the image-side surface of the fourth lens is unlikely to be excessively strong and spherical aberrations, distortion, and astigmatism are corrected properly.

Preferably, the imaging lens according to the present invention satisfies a conditional expression (12) below:

$$0.55 < (r9+r10)/(r9-r10) < 1.25 \tag{12}$$

where r9 denotes the curvature radius of the object-side surface of the fifth lens and r10 denotes the curvature radius of the image-side surface of the fifth lens.

The conditional expression (12) defines an appropriate range for the relation between the curvature radii of the fifth lens representing the paraxial shape of the fifth lens, and indicates a condition to ensure an appropriate back focus and correct aberrations properly. When the value is below the upper limit of the conditional expression (12) and above its lower limit (the lens shape varies from meniscus to biconcave), the refractive power of the image-side surface of the fifth lens is unlikely to be excessively strong and astigmatism, field curvature, and distortion are corrected properly.

Preferably, the imaging lens according to the present invention satisfies a conditional expression (13) below:

$$0.03 < d2/f < 0.06 \tag{13}$$

where f denotes the focal length of the overall optical system and d2 denotes the thickness of the second lens on the optical axis.

The conditional expression (13) defines an appropriate range for the ratio of the center thickness of the second lens to the focal length of the overall optical system, and indicates a condition to ensure high formability and correct chromatic aberrations. If the value is above the upper limit of the conditional expression (13), the thickness of the second lens on the optical axis would be larger, leading to higher formability of the lens, but the refractive power of the second lens would be too weak to correct chromatic aberrations which occur on the first lens. On the other hand, if the value is below the lower limit of the conditional expression (13), the thickness of the second lens on the optical axis would be too small, making it difficult to manufacture the second lens. Also, the refractive power of the second lens would be stronger, resulting in over-correction of chromatic aberrations. In this case as well, it would be difficult to deliver high optical performance.

DETAILED DESCRIPTION OF THE PREFERRED EMBODIMENTS

Hereinafter, the preferred embodiment of the present invention will be described in detail referring to the accompanying drawings.

FIGS. 1, 3, 5, 7, 9, 11, 13, 15, and 17 are schematic views showing the general configurations of the imaging lenses in Examples 1 to 9 according to this embodiment respectively. Since all these examples have the same basic lens configuration, the general configuration of an imaging lens according to this embodiment is explained below referring to mainly the schematic view of Example 1.

Figure 1:
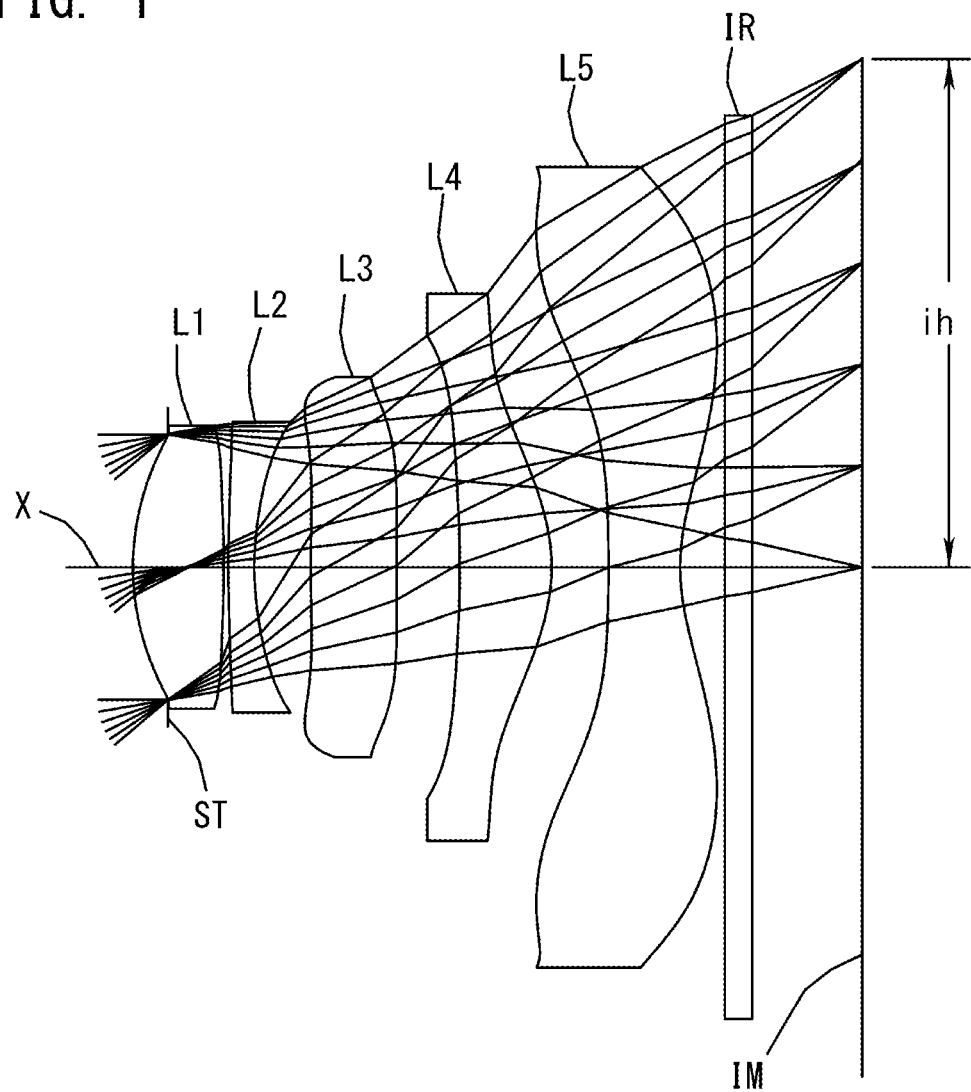
FIG. 1 is a schematic view showing the general configuration of an imaging lens in Example 1.

As shown in FIG. 1, the imaging lens according to this embodiment includes, in order from an object side to an image side, an aperture stop ST, a first lens L1 with positive refractive power, a second lens L2 with negative refractive power, a third lens L3 with positive refractive power, a fourth lens L4 with positive refractive power, and a fifth lens L5 with negative refractive power.

A filter IR such as an infrared cut filter or cover glass is located between the fifth lens L5 and an image plane IM. This filter IR is omissible. Since the image (focusing) position varies depending on the thickness of the filter IR, in the present invention, total track length is defined as the distance on the optical axis from the object-side surface of the first lens L1 to the image plane IM with the filter IR removed.

The above imaging lens composed of five constituent lenses includes a lens group with positive composite refractive power including the first lens L1 and second lens L2, a lens group with positive composite refractive power including the third lens L3 and the fourth lens L4, and the fifth lens L5 with negative refractive power, making up a telephoto system which is advantageous in shortening the total track length.

In the above imaging lens composed of five constituent lenses, the first lens L1 is a biconvex lens with positive refractive power having a convex surface on the object side. The biconvex shape is such that the curvature radius of the object-side surface is smaller than the curvature radius of the image-side surface and the positive refractive power is appropriately distributed to the both surfaces so as to suppress spherical aberrations, provide strong positive refractive power, and ensure that the imaging lens is low-profile and provides a wide field of view. The image-side surface of the first lens L1 may be concave and in this case, it is desirable that its curvature radius be larger than the curvature radius of the object-side surface to the extent that the refractive power does not become too weak and spherical aberrations do not increase. In Examples 4 and 5, the first lens L1 is a meniscus lens.

The second lens L2 is a meniscus lens with negative refractive power having a concave surface on the image side and properly corrects chromatic aberrations which occur on the first lens L1. The shape of the second lens L2 is not limited to the above shape; instead it may be a biconcave lens as in Example 7.

The third lens L3 is a meniscus lens with positive refractive power having a convex surface on the object side. It has the weakest refractive power among the constituent lenses of the imaging lens and gives additional positive refractive power to the whole imaging lens to contribute to making the imaging lens low-profile. Also, through its both aspheric surfaces, it properly corrects spherical aberrations which mainly occur on the first lens L1 and the second lens L2. The shape of the third lens L3 is not limited to the above shape; instead it may be a biconvex lens or a meniscus lens having a concave surface on the object side. If the third lens L3 is a biconvex lens, the positive refractive power can be distributed to the both surfaces so that the positive refractive power is increased while the manufacturing error sensitivity is kept low. Therefore, the positive refractive power of the first lens L1 and the fourth lens L4 can be adjusted appropriately while the imaging lens is kept low-profile, and increase in the manufacturing error sensitivity of each constituent lens can be suppressed.

The fourth lens L4 is a meniscus lens with positive refractive power having a convex surface on the image side and its refractive power is appropriately balanced with the refractive power of the first lens L1 so that the imaging lens is low-profile and provides a wide field of view. In addition, the fourth lens L4 has an aspheric surface in which a remoter portion from the optical axis has weaker positive refractive power and the positive refractive power changes to negative refractive power in the peripheral portion, so spherical aberrations, astigmatism, and distortion are corrected more properly. In addition, the negative refractive power of the peripheral portion makes it possible to capture a sufficient amount of light ray bundles in the peripheral portion, thereby preventing decrease in the amount of light. Alternatively, the fourth lens L4 may be a biconvex lens and in this case, the positive refractive power is appropriately distributed to the object-side surface and the image-side surface so that the imaging lens is low-profile and provides a wide field of view while the manufacturing error sensitivity is kept low. In Examples 4, 6, 7, 8 and 9, the fourth lens L4 is a biconvex lens.

The fifth lens L5 is a biconcave lens with negative refractive power having a concave surface on the image side and ensures an appropriate back focus. Also, it has an aspheric surface on each side, in which the image-side surface has an aspheric shape with pole-change points off the optical axis X. Due to this aspheric shape, astigmatism, distortion, and field curvature are corrected properly and the angle of a chief ray incident on the image sensor is controlled within an appropriate range. Alternatively, the fifth lens L5 may be a meniscus lens having a concave surface on the image side as in Example 7.

The aperture stop ST is located between the apex of the object-side surface of the first lens L1 and the peripheral end of that surface, so the entrance pupil position is relatively remote from the image plane IM, making it easy to ensure telecentricity.

In the imaging lens according to this embodiment, all the constituent lenses are made of plastic material. Therefore, the manufacturing process is simplified and the imaging lens can be mass-produced at low cost. All the lens surfaces have appropriate aspheric shapes so that aberrations are corrected more properly.

The lens material used is not limited to plastic material. Instead, glass material may be used for higher performance. Although it is desirable that all the lens surfaces be aspheric, a lens surface may be not aspheric and have an easy-to-manufacture shape depending on the required performance.

When the imaging lens according to this embodiment satisfies conditional expressions (1) to (13) below, it brings about advantageous effects:

$$0.80 < ih/f < 1.00 \quad (1)$$

$$0.6 < TTL/2ih < 0.75 \quad (2)$$

$$2.3 < f3/f < 10.3 \quad (3)$$

$$0.5 < f1/f4 < 1.4 \quad (4)$$

$$0.5 < f1/f < 1.0 \quad (5)$$

$$-1.6 < f2/f < -0.6 \quad (6)$$

$$25 < vd1 - vd2 < 40 \quad (7)$$

$$-0.9 < f5/f < -0.4 \quad (8)$$

$$-1.4 < (r1+r2)/(r1-r2) < -0.3 \quad (9)$$

$$0.75 < (r3+r4)/(r3-r4) < 3.0 \quad (10)$$

$$0.7 < (r7+r8)/(r7-r8) < 1.8 \quad (11)$$

$$0.55 < (r9+r10)/(r9-r10) < 1.25 \quad (12)$$

$$0.03 < d2/f < 0.06 \quad (13)$$

where
f: focal length of the overall optical system of the imaging lens
f1: focal length of the first lens L1
f2: focal length of the second lens L2
f3: focal length of the third lens L3
f4: focal length of the fourth lens L4
f5: focal length of the fifth lens L5
ih: maximum image height
TTL: distance on the optical axis X from the object-side surface of the first lens L1 to the image plane IM (air-converted length for the filter)
vd1: Abbe number of the first lens L1 at d-ray
vd2: Abbe number of the second lens L2 at d-ray
r1: curvature radius of the object-side surface of the first lens L1
r2: curvature radius of the image-side surface of the first lens L1
r3: curvature radius of the object-side surface of the second lens L2
r4: curvature radius of the image-side surface of the second lens L2
r7: curvature radius of the object-side surface of the fourth lens L4
r8: curvature radius of the image-side surface of the fourth lens L4
r9: curvature radius of the object-side surface of the fifth lens L5
r10: curvature radius of the image-side surface of the fifth lens L5
d2: thickness of the second lens L2 on the optical axis.

When the imaging lens according to this embodiment satisfies conditional expressions (1a) to (13a) below, it brings about more advantageous effects:

$$0.80 < ih/f < 0.95 \quad (1a)$$

$$0.65 < TTL/2ih < 0.75 \quad (2a)$$

$$2.6 < f3/f < 9.5 \quad (3a)$$

$$0.6 < f1/f4 < 1.3 \quad (4a)$$

$$0.5 < f1/f < 0.9 \quad (5a)$$

$$-1.50 < f2/f < -0.75 \quad (6a)$$

$$25 < vd1 - vd2 < 38 \quad (7a)$$

$-0.75 < f5/f < -0.45$ (8a)

$-1.3 < (r1-r2)/(r1-r2) < -0.4$ (9a)

$0.85 < (r3+r4)/(r3-r4) < 2.70$ (10a)

$0.85 < (r7+r8)/(r7-r8) < 1.65$ (11a)

$0.65 < (r9+r10)/(r9-r10) < 1.15$ (12a)

$0.035 < d2/f < 0.060.$ (13a)

In the above conditional expressions, the signs have the same meanings as in the preceding paragraph.

When the imaging lens according to this embodiment satisfies conditional expressions (1b) to (13b) below, it brings about particularly advantageous effects:

$0.80 \leq ih/f \leq 0.90$ (1b)

$0.70 \leq TTL/2ih \leq 0.74$ (2b)

$2.97 \leq f3/f \leq 8.64$ (3b)

$0.69 \leq f1/f4 \leq 1.15$ (4b)

$0.61 \leq f1/f \leq 0.82$ (5b)

$-1.37 \leq f2/f \leq -0.83$ (6b)

$27 \leq vd1 - vd2 \leq 35$ (7b)

$-0.68 \leq f5/f \leq -0.54$ (8b)

$-1.13 \leq (r1+r2)/(r1-r2) \leq -0.47$ (9b)

$0.95 \leq (r3+r4)/(r3-r4) \leq 2.49$ (10b)

$0.93 \leq (r7+r8)/(r7-r8) \leq 1.5$ (11b)

$0.73 \leq (r9+r10)/(r9-r10) \leq 1.03$ (12b)

$0.04 \leq d2/f \leq 0.05.$ (13b)

In the above conditional expressions, the signs have the same meanings as in the paragraph before the preceding paragraph.

In this embodiment, the aspheric shapes of the constituent lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Equation 1

Next, examples of the imaging lens according to this embodiment will be explained. In each example, f denotes the focal length of the overall optical system of the imaging lens, Fno denotes an F-number, ω denotes a half field of view, and ih denotes a maximum image height. i denotes a surface number counted from the object side, r denotes a curvature radius, d denotes the distance between lens surfaces on the optical axis (surface distance), Nd denotes a refractive index at d-ray (reference wavelength), and vd denotes an Abbe number at d-ray. As for aspheric surfaces, an asterisk (*) after surface number i indicates that the surface concerned is an aspheric surface.

Example 1

The basic lens data of Example 1 is shown in Table 1 below.

TABLE 1

Example 1
in mm
f = 4.606
Fno = 2.22
ω(°) = 40.2
ih = 3.936

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.270 | | |
| 2* | 2.000 | 0.700 | 1.5438 | 55.57 |
| 3* | −19.415 | 0.039 | | |
| 4* | 8.583 | 0.200 | 1.6349 | 23.97 |
| 5* | 2.352 | 0.436 | | |
| 6* | 11.465 | 0.664 | 1.5348 | 55.66 |
| 7* | 24.906 | 0.489 | | |
| 8* | −9.050 | 0.711 | 1.5348 | 55.66 |
| 9* | −1.430 | 0.440 | | |
| 10* | −17.139 | 0.554 | 1.5348 | 55.66 |
| 11* | 1.561 | 0.347 | | |
| 12 | Infinity | 0.210 | 1.5168 | 64.20 |
| 13 | Infinity | 0.854 | | |
| Image Plane | Infinity | | | |

Constituent Lens Data

| Lens | Start Surface | Focal Length |
|---|---|---|
| 1 | 2 | 3.373 |
| 2 | 4 | −5.167 |

TABLE 1-continued

Example 1
in mm
f = 4.606
Fno = 2.22
ω(°) = 40.2
ih = 3.936

| 3 | 6 | 39.051 |
| 4 | 8 | 3.076 |
| 5 | 10 | −2.648 |

Aspheric Surface Data

| | 2nd Surface | 3rd Surface | 4th Surface | 5th Surface | 6th Surface | 7th Surface |
|---|---|---|---|---|---|---|
| k | 1.839E−01 | 0.000E+00 | 0.000E+00 | −7.594E+00 | 0.000E+00 | 0.000E+00 |
| A4 | 2.229E−03 | −1.094E−01 | −2.342E−01 | −8.591E−02 | −8.517E−02 | −5.156E−02 |
| A6 | −2.415E−02 | 3.805E−01 | 6.868E−01 | 3.318E−01 | 2.182E−02 | −1.586E−02 |
| A8 | 3.548E−02 | −5.449E−01 | −9.523E−01 | −4.117E−01 | −2.443E−03 | 1.093E−02 |
| A10 | −3.765E−02 | 3.484E−01 | 6.738E−01 | 2.795E−01 | −7.379E−03 | −7.391E−03 |
| A12 | 1.902E−02 | −1.100E−01 | −2.470E−01 | −9.261E−02 | 6.524E−03 | 2.645E−03 |
| A14 | −6.820E−03 | 1.434E−02 | 4.078E−02 | 1.247E−02 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface |
|---|---|---|---|---|
| k | 0.000E+00 | −1.995E+00 | 0.000E+00 | −6.564E+00 |
| A4 | 1.950E−02 | 6.957E−02 | −4.731E−02 | −4.413E−02 |
| A6 | −3.241E−03 | −4.168E−02 | 5.263E−05 | 1.101E−02 |
| A8 | −5.452E−03 | 2.570E−02 | 4.243E−03 | −2.123E−03 |
| A10 | 1.946E−03 | −7.904E−03 | −9.383E−04 | 2.581E−04 |
| A12 | −2.215E−04 | 1.131E−03 | 8.324E−05 | −1.827E−05 |
| A14 | 0.000E+00 | −6.213E−05 | −2.747E−06 | 5.651E−07 |
| A16 | 0.000E+00 | 0.000E+00 | 0.000E+00 | 0.000E+00 |

As shown in Table 10, the imaging lens in Example 1 satisfies the conditional expressions (1) to (13).

Figure 2:
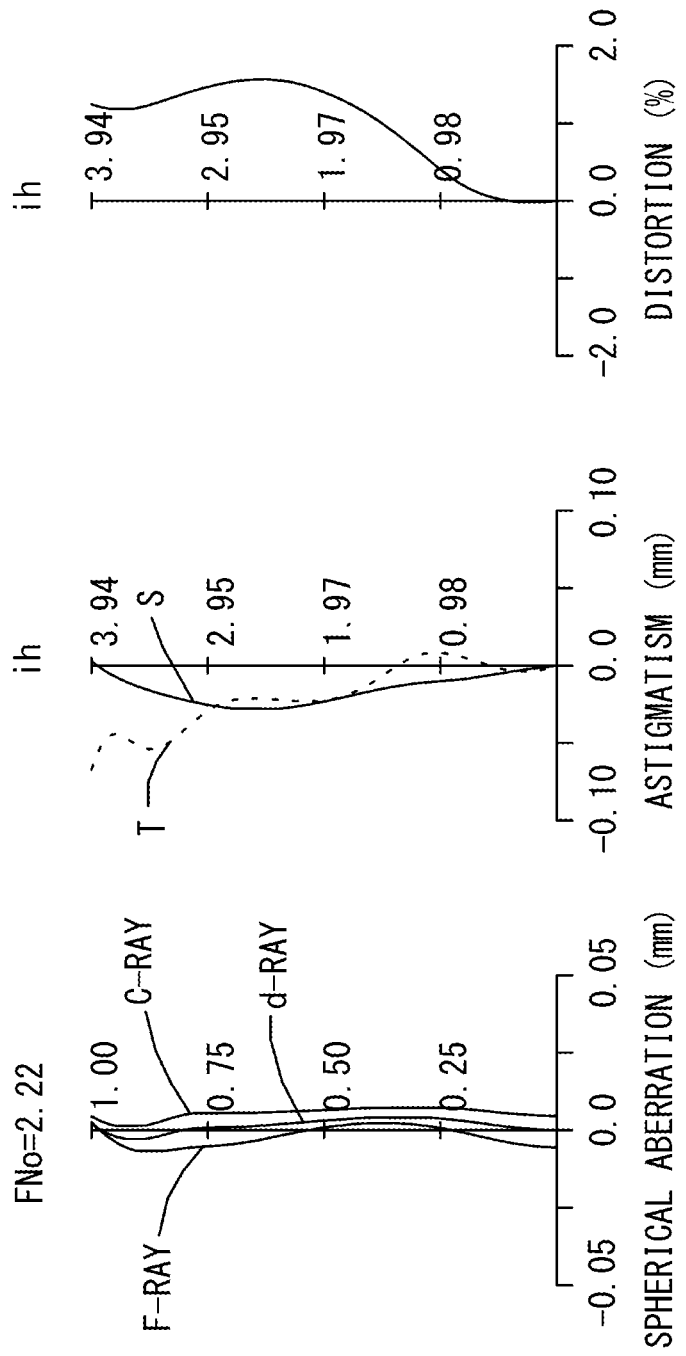
FIG. 2 shows spherical aberration, astigmatism, and distortion of the imaging lens in Example 1.
Figure 3:
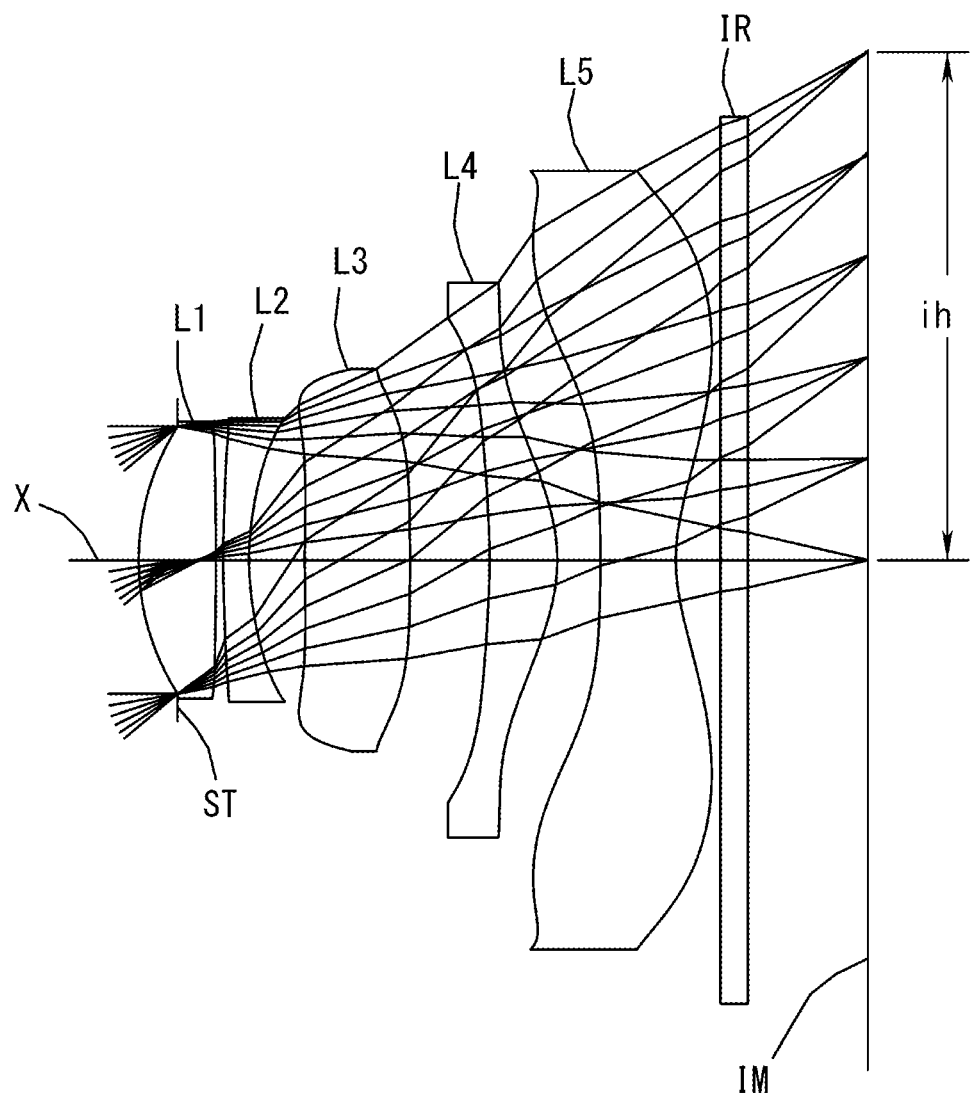
FIG. 3 is a schematic view showing the general configuration of an imaging lens in Example 2.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration on sagittal image surface S at d-ray and the amount of aberration on tangential image surface T at d-ray (the same is true for FIGS. 4, 6, 8, 10, 12, 14, 16, and 18). As shown in FIG. 2, each aberration is corrected properly.

The ratio of total track length TTL to maximum image height ih (TTL/2ih) is 0.71, suggesting that the imaging lens is low-profile. Also, the imaging lens provides high brightness with an F-value of 2.2 and a wide imaging field of view of about 80 degrees.

Example 2

The basic lens data of Example 2 is shown in Table 2 below.

TABLE 2

Example 2
in mm
f = 4.649
Fno = 2.22
ω(°) = 39.9
ih = 3.936

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.300 | | |
| 2* | 1.934 | 0.598 | 1.5438 | 55.57 |
| 3* | −100.000 | 0.057 | | |
| 4* | 6.010 | 0.200 | 1.6349 | 23.97 |
| 5* | 2.123 | 0.432 | | |
| 6* | 15.500 | 0.814 | 1.5346 | 56.16 |
| 7* | −27.268 | 0.613 | | |
| 8* | −6.725 | 0.525 | 1.5348 | 55.66 |
| 9* | −1.345 | 0.333 | | |

TABLE 2-continued

Example 2
in mm
f = 4.649
Fno = 2.22
ω(°) = 39.9
ih = 3.936

| | | | | |
|---|---|---|---|---|
| 10* | −16.563 | 0.584 | 1.5348 | 55.66 |
| 11* | 1.470 | 0.347 | | |
| 12 | Infinity | 0.210 | 1.5168 | 64.20 |
| 13 | Infinity | 0.927 | | |
| Image Plane | Infinity | | | |

Constituent Lens Data

| Lens | Start Surface | Focal Length |
|---|---|---|
| 1 | 2 | 3.496 |
| 2 | 4 | −5.275 |
| 3 | 6 | 18.608 |
| 4 | 8 | 3.040 |
| 5 | 10 | −2.497 |

Aspheric Surface Data

| | 2nd Surface | 3rd Surface | 4th Surface | 5th Surface | 6th Surface | 7th Surface |
|---|---|---|---|---|---|---|
| k   | 3.650E−01 | 0.000E+00 | 0.000E+00 | −7.943E+00 | 0.000E+00 | 0.000E+00 |
| A4  | 8.116E−04 | −1.074E−01 | −2.705E−02 | −9.656E−02 | −7.059E−02 | −4.105E−02 |
| A6  | −1.139E−02 | 3.583E−01 | 6.893E−01 | 3.430E−01 | 5.350E−03 | −2.537E−02 |
| A8  | 2.055E−03 | −5.847E−01 | −9.808E−01 | −4.220E−01 | 1.407E−02 | 1.992E−02 |
| A10 | 6.499E−03 | 5.808E−01 | 8.687E−01 | 3.137E−01 | −2.185E−02 | −1.187E−02 |
| A12 | −3.615E−03 | −3.493E−01 | −4.680E−01 | −1.316E−01 | 1.244E−02 | 3.485E−03 |
| A14 | −3.282E−03 | 8.928E−02 | 1.148E−01 | 2.682E−02 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface |
|---|---|---|---|---|
| k   | 0.000E+00 | −2.882E+00 | 0.000E+00 | −6.712E+00 |
| A4  | 2.419E−02 | 5.149E−02 | −4.290E−02 | −4.788E−02 |
| A6  | −3.206E−04 | −2.906E−02 | −8.955E−03 | 1.253E−02 |
| A8  | −7.826E−03 | 1.952E−02 | 8.763E−03 | −2.566E−03 |
| A10 | 2.437E−03 | −6.224E−03 | −1.878E−03 | 3.336E−04 |
| A12 | −2.334E−04 | 8.984E−04 | 1.733E−04 | −2.533E−05 |
| A14 | 0.000E+00 | −4.919E−05 | −6.052E−06 | 8.437E−07 |
| A16 | 0.000E+00 | 0.000E+00 | 0.000E+00 | 0.000E+00 |

As shown in Table 10, the imaging lens in Example 2 satisfies the conditional expressions (1) to (13).

Figure 4:
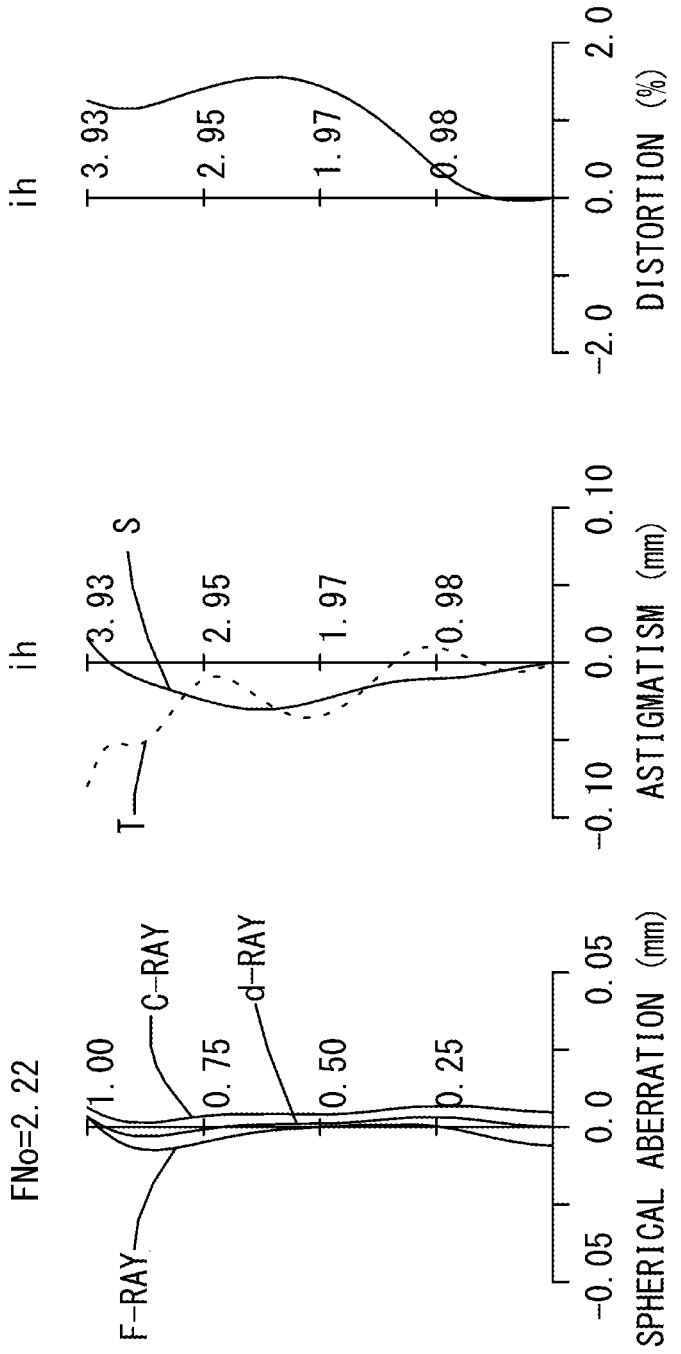
FIG. 4 shows spherical aberration, astigmatism, and distortion of the imaging lens in Example 2.
Figure 5:
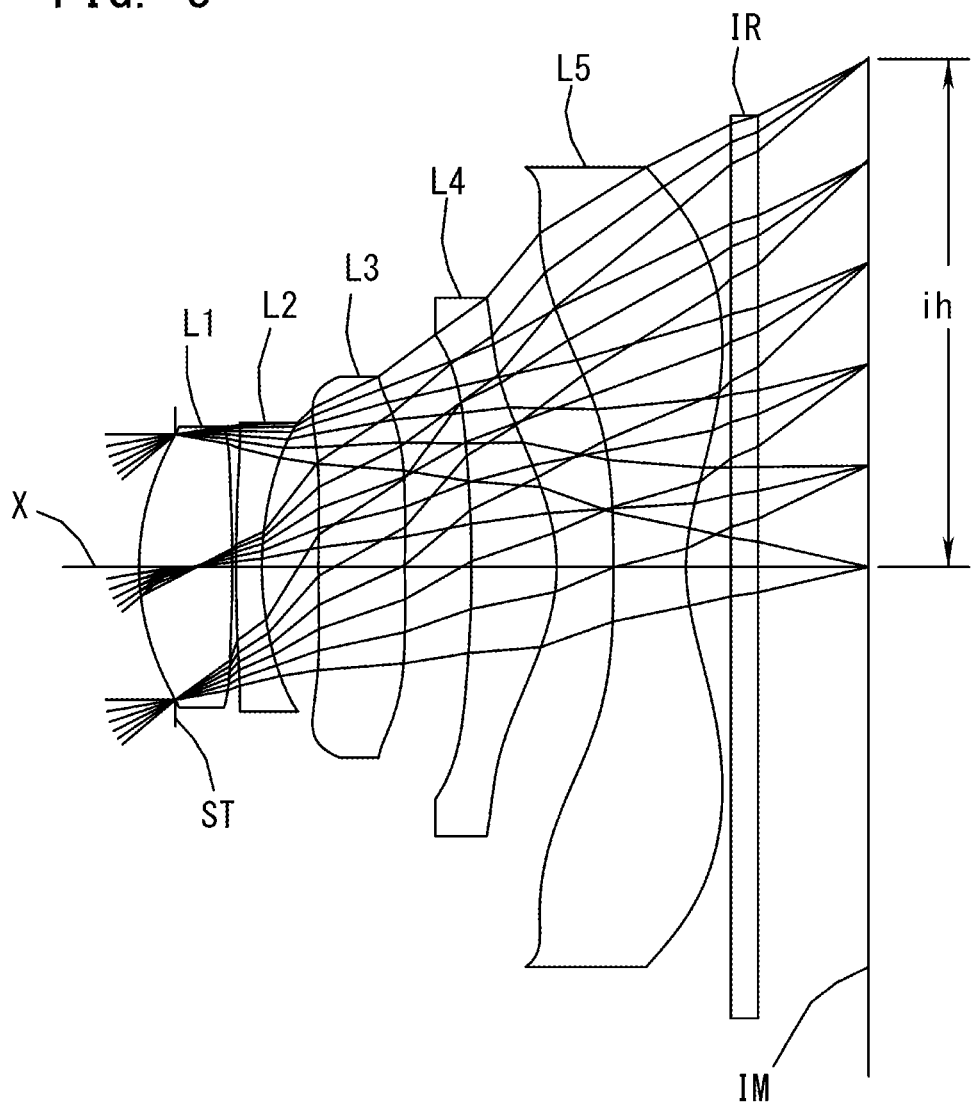
FIG. 5 is a schematic view showing the general configuration of an imaging lens in Example 3.

FIG. 4 shows spherical aberration (mm), astigmatism (mm), and distortion (%) of the imaging lens in Example 2. As shown in FIG. 4, each aberration is corrected properly.

The ratio of total track length TTL to maximum image height ih (TTL/2ih) is 0.71, suggesting that the imaging lens is low-profile. Also, the imaging lens provides high brightness with an F-value of 2.2 and a wide imaging field of view of about 80 degrees.

Example 3

The basic lens data of Example 3 is shown in Table 3 below.

TABLE 3

Example 3
in mm
f = 4.606
Fno = 2.22
ω(°) = 40.2
ih = 3.936

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.280 | | |
| 2* | 2.000 | 0.719 | 1.5438 | 55.57 |
| 3* | −20.333 | 0.030 | | |
| 4* | 7.719 | 0.200 | 1.6349 | 23.97 |
| 5* | 2.297 | 0.438 | | |
| 6* | 14.026 | 0.669 | 1.5348 | 55.66 |

TABLE 3-continued

Example 3
in mm
f = 4.606
Fno = 2.22
ω(°) = 40.2
ih = 3.936

| | | | | |
|---|---|---|---|---|
| 7* | 40.452 | 0.516 | | |
| 8* | −8.157 | 0.658 | 1.5348 | 55.66 |
| 9* | −1.411 | 0.440 | | |
| 10* | −15.646 | 0.562 | 1.5348 | 55.66 |
| 11* | 1.587 | 0.347 | | |
| 12 | Infinity | 0.210 | 1.5168 | 64.20 |
| 13 | Infinity | 0.856 | | |
| Image Plane | Infinity | | | |

Constituent Lens Data

| Lens | Start Surface | Focal Length |
|---|---|---|
| 1 | 2 | 3.387 |
| 2 | 4 | −5.225 |
| 3 | 6 | 39.795 |
| 4 | 8 | 3.085 |
| 5 | 10 | −2.664 |

Aspheric Surface Data

| | 2nd Surface | 3rd Surface | 4th Surface | 5th Surface | 6th Surface | 7th Surface |
|---|---|---|---|---|---|---|
| k | 2.653E−01 | 0.000E+00 | 0.000E+00 | −7.552E+00 | 0.000E+00 | 0.000E+00 |
| A4 | 1.927E−03 | −1.145E−01 | −2.377E−01 | −7.470E−02 | −7.855E−02 | −4.710E−02 |
| A6 | −2.047E−02 | 4.459E−02 | 7.254E−01 | 3.013E−01 | 2.115E−02 | −1.628E−02 |
| A8 | 2.727E−02 | −6.947E−01 | −1.067E+00 | −3.709E−01 | −7.147E−03 | 1.047E−02 |
| A10 | −2.654E−02 | 5.145E−01 | 8.224E−01 | 2.513E−01 | −4.862E−04 | −6.980E−03 |
| A12 | 1.267E−02 | −2.036E−01 | −3.439E−01 | −8.485E−02 | 3.973E−03 | 2.503E−03 |
| A14 | −4.978E−03 | 3.597E−02 | 6.574E−02 | 1.219E−02 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface |
|---|---|---|---|---|
| k | 0.000E+00 | −1.922E+00 | 0.000E+00 | −6.754E+00 |
| A4 | 1.909E−02 | 6.986E−02 | −4.433E−02 | −4.224E−02 |
| A6 | −3.598E−03 | −4.374E−02 | −1.543E−03 | 1.007E−02 |
| A8 | −3.623E−03 | 2.791E−02 | 4.874E−03 | −1.862E−03 |
| A10 | 8.643E−04 | −8.935E−03 | −1.083E−03 | 2.158E−04 |
| A12 | −5.326E−05 | 1.336E−03 | 9.915E−05 | −1.458E−05 |
| A14 | 0.000E+00 | −7.700E−05 | −3.407E−06 | 4.347E−07 |
| A16 | 0.000E+00 | 0.000E+00 | 0.000E+00 | 0.000E+00 |

As shown in Table 10, the imaging lens in Example 3 satisfies the conditional expressions (1) to (13).

Figure 6:
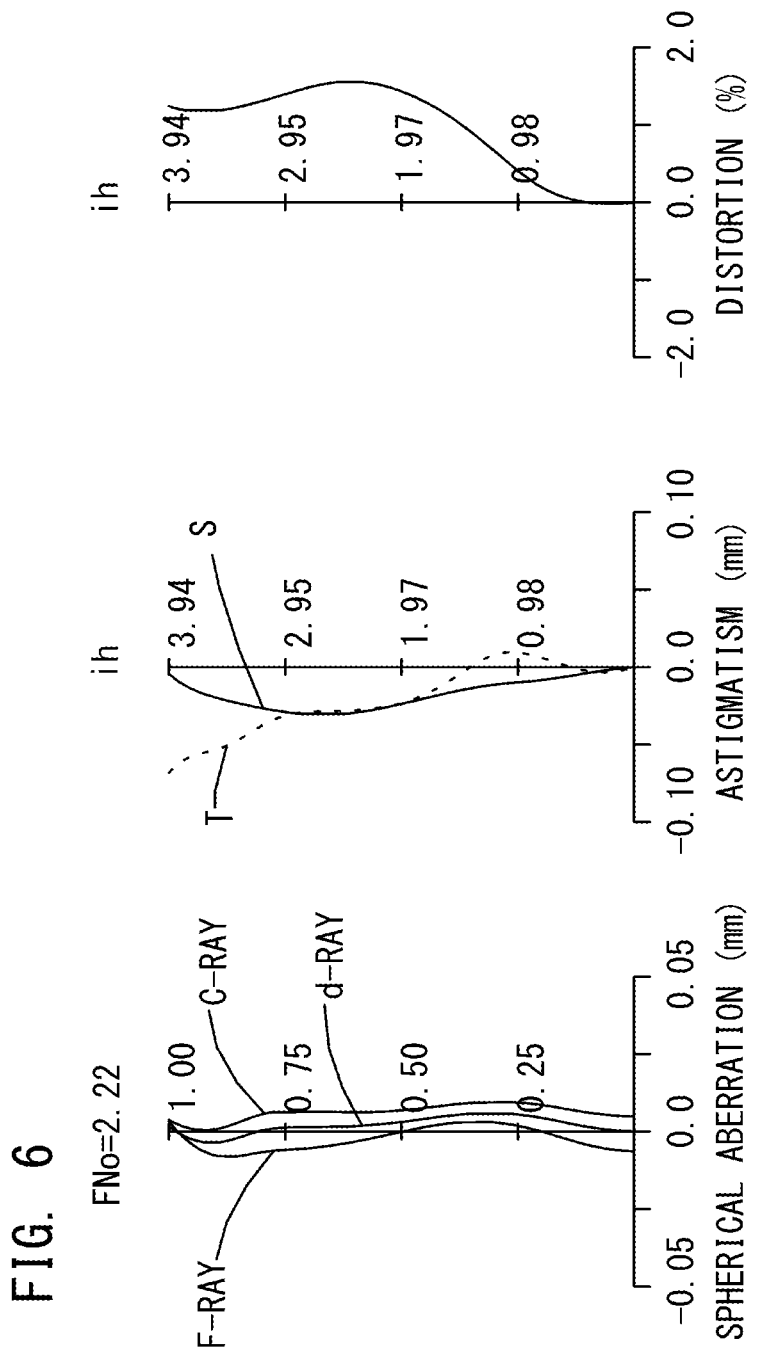
FIG. 6 shows spherical aberration, astigmatism, and distortion of the imaging lens in Example 3.
Figure 7:
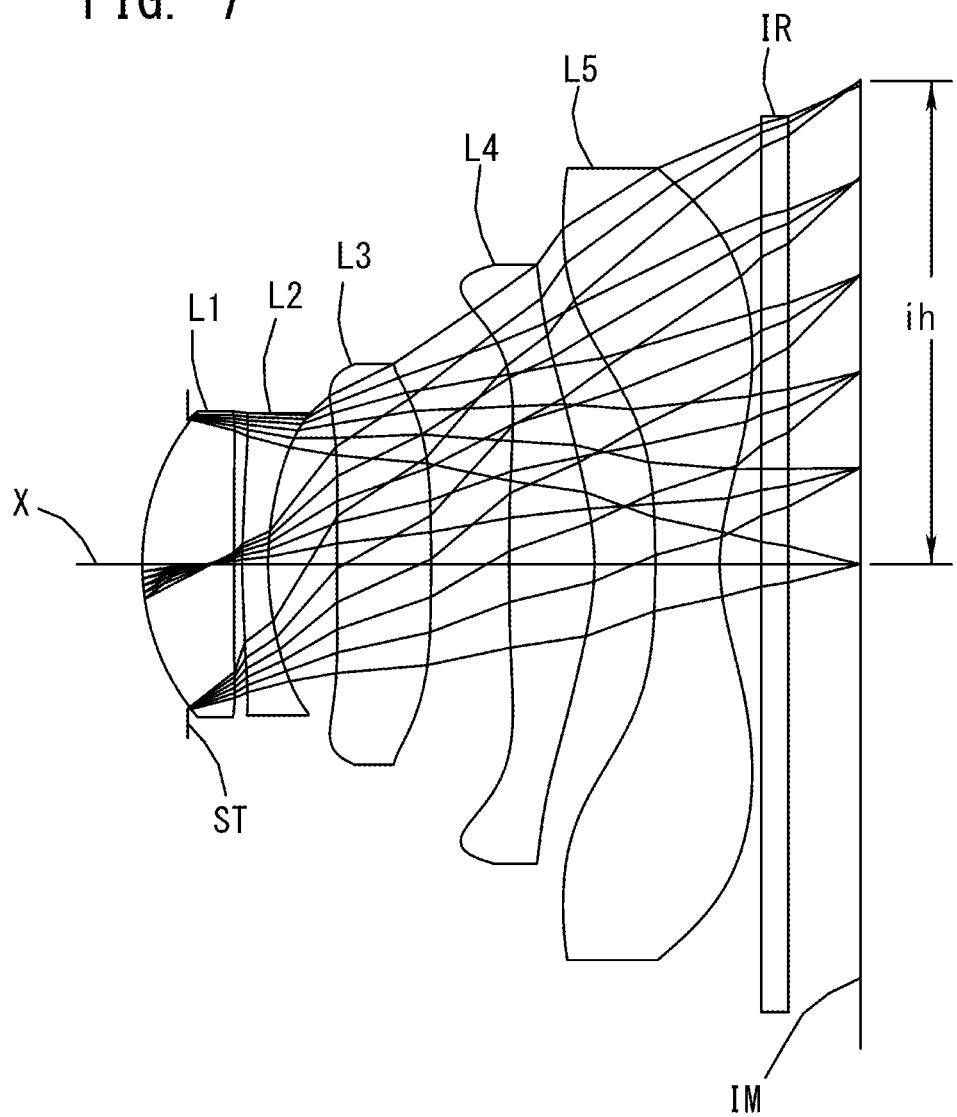
FIG. 7 is a schematic view showing the general configuration of an imaging lens in Example 4.

FIG. 6 shows spherical aberration (mm), astigmatism (mm), and distortion (%) of the imaging lens in Example 3. As shown in FIG. 6, each aberration is corrected properly.

The ratio of total track length TTL to maximum image height ih (TTL/2ih) is 0.71, suggesting that the imaging lens is low-profile. Also, the imaging lens provides high brightness with an F-value of 2.2 and a wide imaging field of view of about 80 degrees.

Example 4

The basic lens data of Example 4 is shown in Table 4 below.

TABLE 4

Example 4
in mm
f = 4.575
Fno = 2.04
ω(°) = 38.9
ih = 3.744

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.350 | | |
| 2* | 1.900 | 0.710 | 1.5438 | 55.57 |
| 3* | 30.266 | 0.063 | | |
| 4* | 5.194 | 0.200 | 1.6349 | 23.97 |

TABLE 4-continued

Example 4
in mm
f = 4.575
Fno = 2.04
ω(°) = 38.9
ih = 3.744

| | | | | |
|---|---|---|---|---|
| 5* | 2.218 | 0.532 | | |
| 6* | 17.178 | 0.729 | 1.5346 | 56.16 |
| 7* | −27.434 | 0.606 | | |
| 8* | 64.334 | 0.658 | 1.5348 | 55.66 |
| 9* | −1.994 | 0.471 | | |
| 10* | −10.384 | 0.500 | 1.5348 | 55.66 |
| 11* | 1.628 | 0.320 | | |
| 12 | Infinity | 0.210 | 1.5168 | 64.20 |
| 13 | Infinity | 0.557 | | |
| Image Plane | Infinity | | | |

Constituent Lens Data

| Lens | Start Surface | Focal Length |
|---|---|---|
| 1 | 2 | 3.695 |
| 2 | 4 | −6.260 |
| 3 | 6 | 19.872 |
| 4 | 8 | 3.629 |
| 5 | 10 | −2.594 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | 1.933E−03 | −9.289E−02 | −2.180E−01 | −1.453E−01 | −4.943E−02 | −3.596E−02 |
| A6 | 9.998E−03 | 2.240E−01 | 4.126E−01 | 2.603E−01 | −9.577E−03 | −3.545E−02 |
| A8 | −1.509E−02 | −2.319E−01 | −4.042E−01 | −2.298E−01 | 2.753E−02 | 3.221E−02 |
| A10 | 1.595E−02 | 1.151E−01 | 1.900E−01 | 1.038E−01 | −2.147E−02 | −1.469E−02 |
| A12 | −6.014E−03 | −2.569E−02 | −3.645E−02 | −1.473E−02 | 6.679E−03 | 2.891E−03 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface |
|---|---|---|---|---|
| k | 0.000E+00 | −4.171E+00 | 0.000E+00 | −6.111E+00 |
| A4 | 4.952E−02 | 8.619E−02 | −5.205E−02 | −5.693E−02 |
| A6 | −4.551E−02 | −5.598E−02 | −1.866E−02 | 1.596E−02 |
| A8 | 1.558E−02 | 1.869E−02 | 1.600E−02 | −3.333E−03 |
| A10 | −3.504E−03 | −3.226E−03 | −3.837E−03 | 4.805E−04 |
| A12 | 3.413E−04 | 2.747E−04 | 4.479E−04 | −4.723E−05 |
| A14 | 0.000E+00 | −9.097E−06 | −2.627E−05 | 2.674E−06 |
| A16 | 0.000E+00 | 0.000E+00 | 6.217E−07 | −6.203E−08 |

As shown in Table 10, the imaging lens in Example 4 satisfies the conditional expressions (1) to (13).

Figure 8:
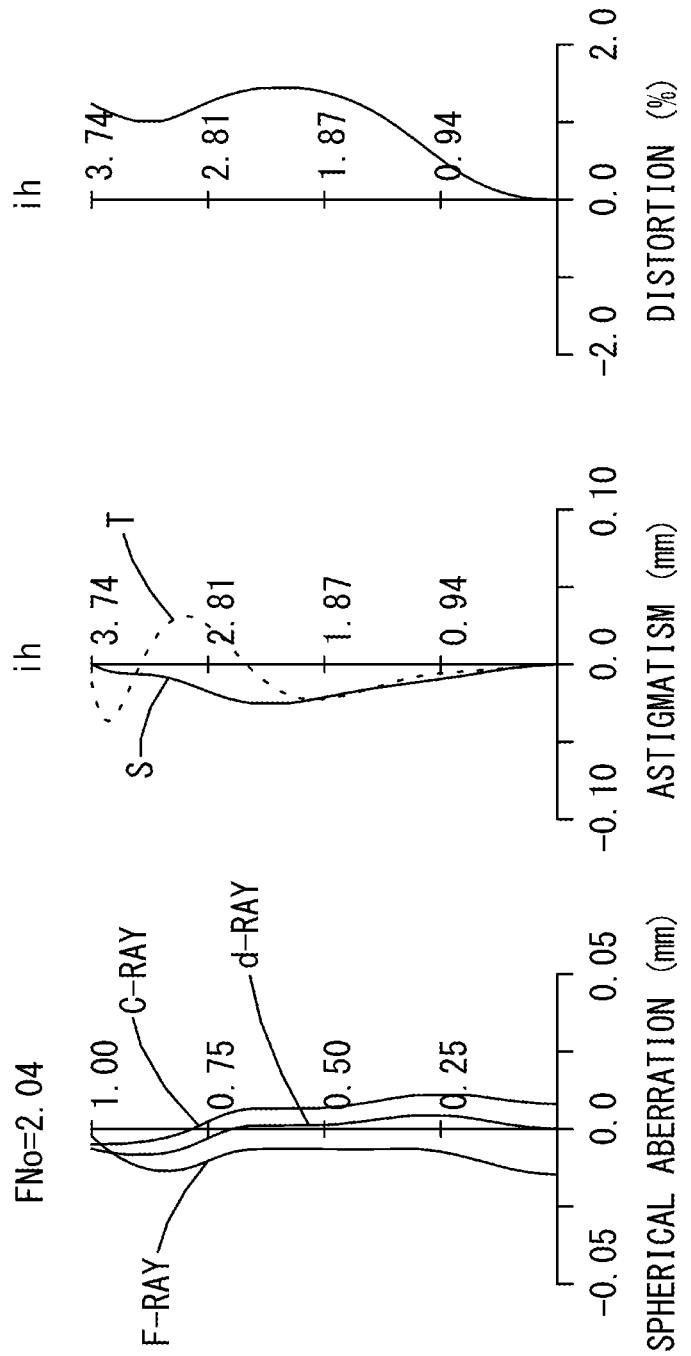
FIG. 8 shows spherical aberration, astigmatism, and distortion of the imaging lens in Example 4.
Figure 9:
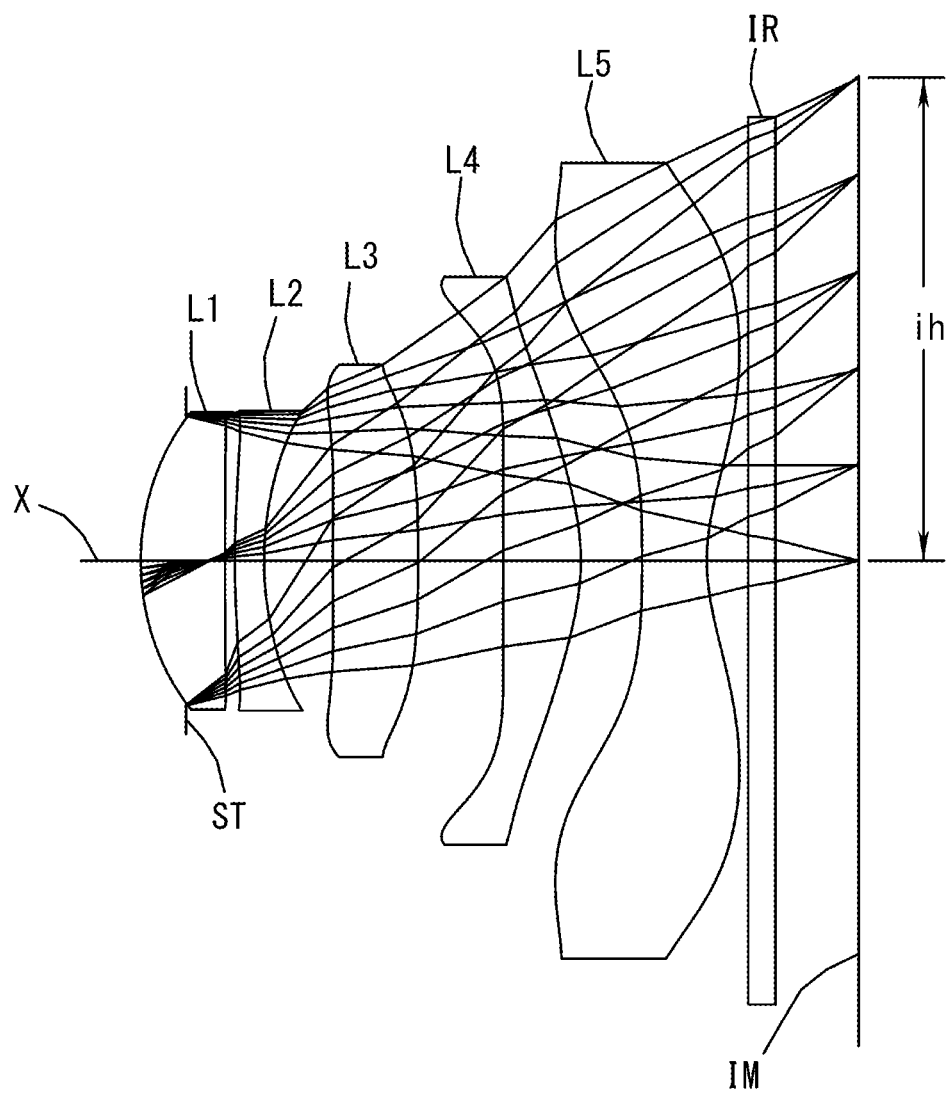
FIG. 9 is a schematic view showing the general configuration of an imaging lens in Example 5.

FIG. 8 shows spherical aberration (mm), astigmatism (mm), and distortion (%) of the imaging lens in Example 4. As Shown in FIG. 8, each aberration is corrected properly.

The ratio of total track length TTL to maximum image height ih (TTL/2ih) is 0.73, suggesting that the imaging lens is low-profile. Also, the imaging lens provides high brightness with an F-value of 2.0 and a wide imaging field of view of about 78 degrees.

Example 5

The basic lens data of Example 5 is shown in Table 5 below.

TABLE 5

Example 5
in mm
f = 4.565
Fno = 2.04
ω(°) = 38.9
ih = 3.744

Surface Data

| Surface No. i | Curvature Radius r | Surface Distance d | Refractive Index Nd | Abbe Number νd |
|---|---|---|---|---|
| (Object Surface) | Infinity | Infinity | | |
| 1(Stop) | Infinity | −0.350 | | |

TABLE 5-continued

Example 5
in mm
f = 4.565
Fno = 2.04
ω(°) = 38.9
ih = 3.744

| | | | | |
|---|---|---|---|---|
| 2* | 1.970 | 0.652 | 1.5438 | 55.57 |
| 3* | 56.036 | 0.075 | | |
| 4* | 5.685 | 0.226 | 1.6349 | 23.97 |
| 5* | 2.253 | 0.532 | | |
| 6* | 18.792 | 0.661 | 1.5346 | 56.16 |
| 7* | −14.836 | 0.659 | | |
| 8* | −28.478 | 0.600 | 1.5348 | 55.66 |
| 9* | −1.786 | 0.475 | | |
| 10* | −10.487 | 0.500 | 1.5348 | 55.66 |
| 11* | 1.618 | 0.320 | | |
| 12 | Infinity | 0.210 | 1.5168 | 64.20 |
| 13 | Infinity | 0.645 | | |
| Image Plane | Infinity | | | |

Constituent Lens Data

| Lens | Start Surface | Focal Length |
|---|---|---|
| 1 | 2 | 3.739 |
| 2 | 4 | −6.032 |
| 3 | 6 | 15.614 |
| 4 | 8 | 3.535 |
| 5 | 10 | −2.584 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | 4.418E−03 | −4.897E−02 | −1.488E−01 | −1.110E−01 | −5.385E−02 | −3.392E−02 |
| A6 | 7.098E−03 | 1.120E−01 | 2.310E−01 | 1.666E−01 | 1.120E−02 | −3.502E−02 |
| A8 | −1.519E−02 | −8.796E−02 | −1.691E−01 | −1.115E−01 | −2.600E−03 | 3.196E−02 |
| A10 | 1.917E−02 | 2.813E−02 | 3.800E−02 | 2.672E−02 | 1.080E−03 | −1.542E−02 |
| A12 | −7.374E−03 | −5.751E−03 | 1.079E−03 | 3.291E−03 | 9.289E−04 | 3.435E−03 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface |
|---|---|---|---|---|
| k | 0.000E+00 | −3.674E+00 | 0.000E+00 | −6.142E+00 |
| A4 | 4.702E−02 | 7.337E−02 | −5.134E−02 | −5.661E−02 |
| A6 | −4.147E−02 | −4.872E−02 | −1.838E−02 | 1.580E−02 |
| A8 | 1.321E−02 | 1.523E−02 | 1.603E−02 | −3.294E−03 |
| A10 | −2.995E−03 | −2.177E−03 | −3.900E−03 | 4.797E−04 |
| A12 | 3.092E−04 | 1.177E−04 | 4.635E−04 | −4.867E−05 |
| A14 | 0.000E+00 | −4.407E−07 | −2.775E−05 | 2.993E−06 |
| A16 | 0.000E+00 | 0.000E+00 | 6.702E−07 | −7.898E−08 |

As shown in Table 10, the imaging lens in Example 5 satisfies the conditional expressions (1) to (13).

Figure 10:
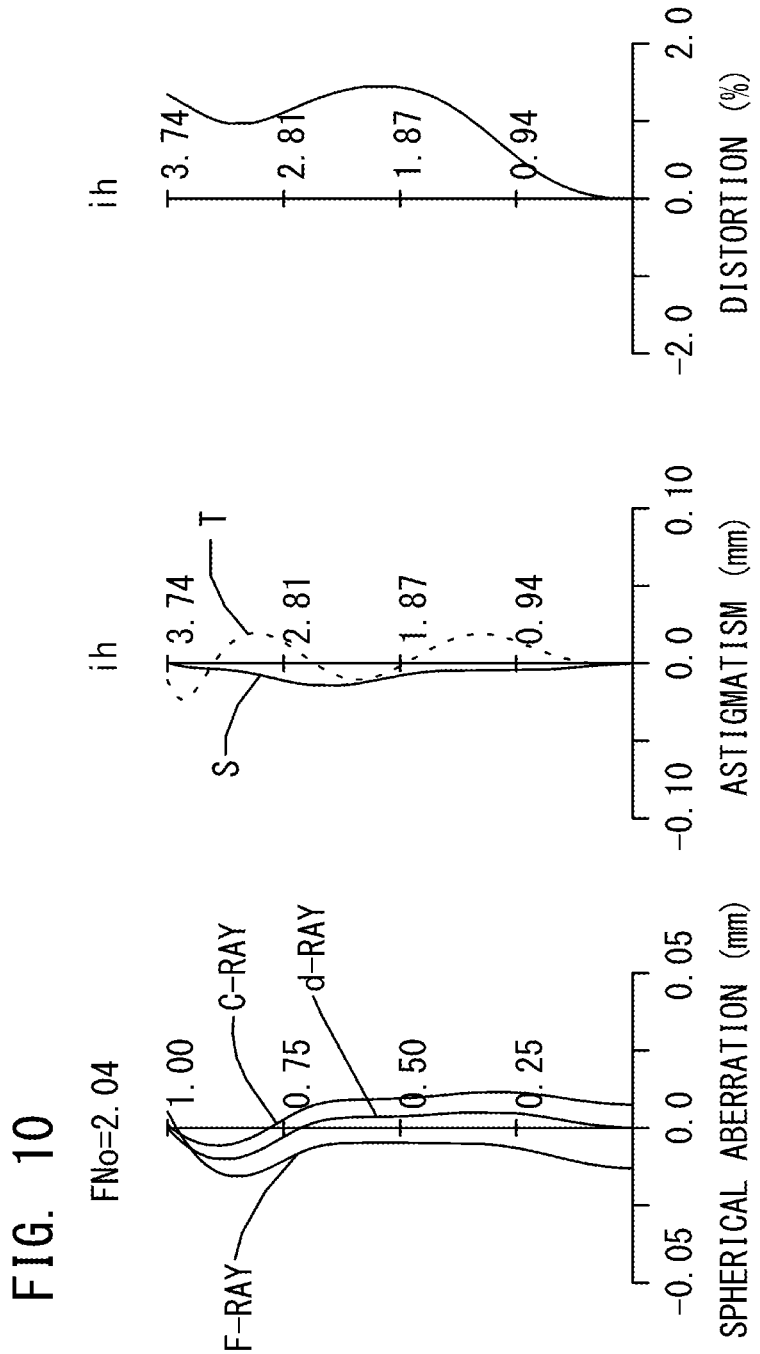
FIG. 10 shows spherical aberration, astigmatism, and distortion of the imaging lens in Example 5.
Figure 11:
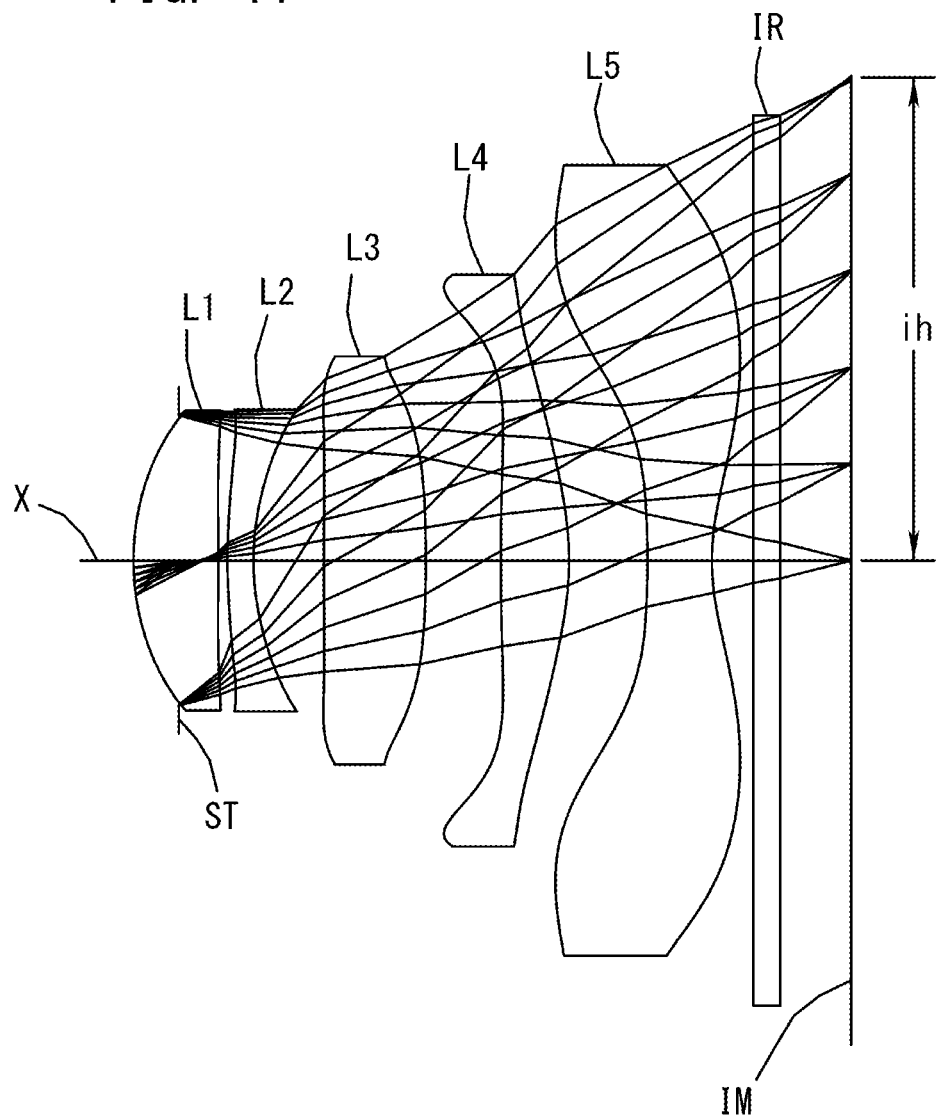
FIG. 11 is a schematic view showing the general configuration of an imaging lens in Example 6.

FIG. 10 shows spherical aberration (mm), astigmatism (mm), and distortion (%) of the imaging lens in Example 5. As shown in FIG. 10, each aberration is corrected properly.

The ratio of total track length TTL to maximum image height ih (TTL/2ih) is 0.73, suggesting that the imaging lens is low-profile. Also, the imaging lens provides high brightness with an F-value of 2.0 and a wide imaging field of view of about 78 degrees.

Example 6

The basic lens data of Example 6 is shown in Table 6 below.

TABLE 6

Example 6
in mm
f = 4.564
Fno = 2.04
ω(°) = 39.0
ih = 3.744

Surface Data

| Surface No. i | Curvature Radius r | Surface Distance d | Refractive Index Nd | Abbe Number vd |
|---|---|---|---|---|
| (Object Surface) | Infinity | Infinity | | |
| 1(Stop) | Infinity | −0.350 | | |
| 2* | 1.985 | 0.656 | 1.5438 | 55.57 |
| 3* | −44.041 | 0.071 | | |
| 4* | 4.656 | 0.200 | 1.6349 | 23.97 |
| 5* | 1.900 | 0.545 | | |
| 6* | 17.604 | 0.789 | 1.5346 | 56.16 |
| 7* | −12.132 | 0.584 | | |
| 8* | 100.000 | 0.525 | 1.5348 | 55.66 |
| 9* | −2.328 | 0.605 | | |
| 10* | −12.184 | 0.500 | 1.5348 | 55.66 |
| 11* | 1.786 | 0.320 | | |
| 12 | Infinity | 0.210 | 1.5168 | 64.20 |
| 13 | Infinity | 0.549 | | |
| Image Plane | Infinity | | | |

Constituent Lens Data

| Lens | Start Surface | Focal Length |
|---|---|---|
| 1 | 2 | 3.510 |
| 2 | 4 | −5.202 |
| 3 | 6 | 13.560 |
| 4 | 8 | 4.262 |
| 5 | 10 | −2.877 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | 9.328E−03 | 1.345E−02 | −1.082E−01 | −1.233E−01 | −4.500E−02 | −3.710E−02 |
| A6 | −8.810E−03 | 2.967E−02 | 1.624E−01 | 1.586E−01 | 2.751E−02 | −2.382E−02 |
| A8 | 1.682E−02 | −2.014E−02 | −1.366E−01 | −1.138E−01 | −2.136E−02 | 2.114E−02 |
| A10 | −8.126E−03 | −1.478E−03 | 4.250E−02 | 3.296E−02 | 1.261E−02 | −9.663E−03 |
| A12 | 2.096E−03 | 1.406E−03 | −5.303E−03 | −2.819E−05 | −2.167E−03 | 2.083E−03 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface |
|---|---|---|---|---|
| k | 0.000E+00 | −5.050E+00 | 0.000E+00 | −6.142E+00 |
| A4 | 3.656E−02 | 5.380E−02 | −8.915E−02 | −6.515E−02 |
| A6 | −3.679E−02 | −3.186E−02 | 7.584E−03 | 2.050E−02 |
| A8 | 1.176E−02 | 9.143E−03 | 7.440E−03 | −4.684E−03 |
| A10 | −2.875E−03 | −1.150E−03 | −2.312E−03 | 7.389E−04 |
| A12 | 3.193E−04 | 4.356E−05 | 2.966E−04 | −7.743E−05 |
| A14 | 0.000E+00 | 1.088E−06 | −1.843E−05 | 4.670E−06 |
| A16 | 0.000E+00 | 0.000E+00 | 4.563E−07 | −1.180E−07 |

As shown in Table 10, the imaging lens in Example 6 satisfies the conditional expressions (1) to (13).

Figure 12:
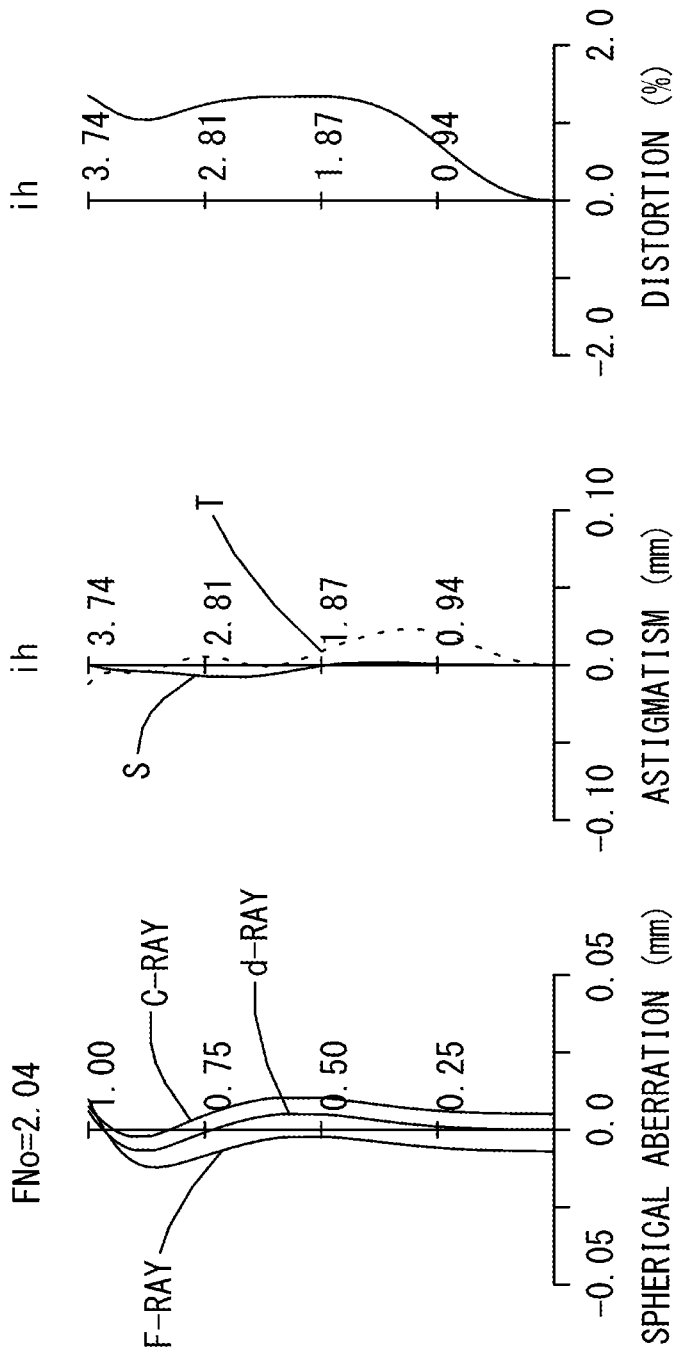
FIG. 12 shows spherical aberration, astigmatism, and distortion of the imaging lens in Example 6.
Figure 13:
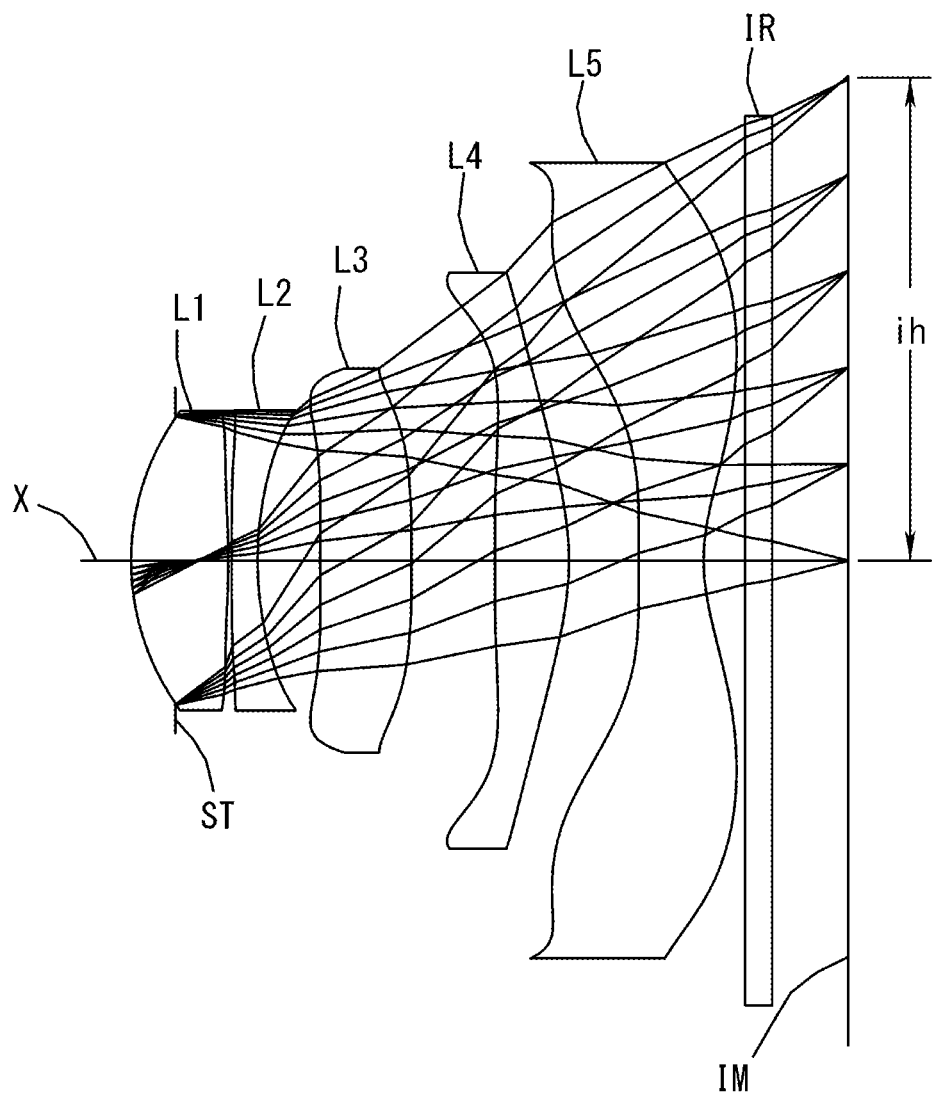
FIG. 13 is a schematic view showing the general configuration of an imaging lens in Example 7.

FIG. 12 shows spherical aberration (mm), astigmatism (mm), and distortion (%) of the imaging lens in Example 6. As shown in FIG. 12, each aberration is corrected properly.

The ratio of total track length TTL to maximum image height ih (TTL/2ih) is 0.73, suggesting that the imaging lens is low-profile. Also, the imaging lens provides high brightness with an F-value of 2.0 and a wide imaging field of view of about 78 degrees.

Example 7

The basic lens data of Example 7 is shown in Table 7 below.

TABLE 7

Example 7
in mm
f = 4.553
Fno = 2.04
ω(°) = 39.0
ih = 3.744

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.340 | | |
| 2* | 1.970 | 0.751 | 1.5438 | 55.57 |
| 3* | −5.520 | 0.027 | | |
| 4* | −100.000 | 0.200 | 1.6349 | 23.97 |
| 5* | 2.455 | 0.485 | | |
| 6* | 38.581 | 0.707 | 1.5346 | 56.16 |
| 7* | −18.504 | 0.645 | | |
| 8* | 61.924 | 0.572 | 1.5348 | 55.66 |
| 9* | −2.215 | 0.541 | | |
| 10* | 90.341 | 0.502 | 1.5348 | 55.66 |
| 11* | 1.523 | 0.320 | | |
| 12 | Infinity | 0.210 | 1.5168 | 64.20 |
| 13 | Infinity | 0.588 | | |
| Image Plane | Infinity | | | |

Constituent Lens Data

| Lens | Start Surface | Focal Length |
|---|---|---|
| 1 | 2 | 2.768 |
| 2 | 4 | −3.771 |
| 3 | 6 | 23.494 |
| 4 | 8 | 4.011 |
| 5 | 10 | −2.902 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | 5.259E−03 | 1.809E−01 | 7.803E−02 | −7.981E−02 | −6.016E−02 | −4.344E−02 |
| A6 | −1.693E−03 | −2.948E−01 | −1.536E−01 | 1.082E−01 | −1.691E−02 | −3.061E−02 |
| A8 | −7.669E−03 | 3.757E−01 | 2.837E−01 | −3.041E−02 | 3.888E−02 | 2.961E−02 |
| A10 | 1.418E−02 | −2.752E−01 | −2.602E−01 | −2.765E−02 | −2.942E−02 | −1.435E−02 |
| A12 | −7.336E−03 | 7.485E−02 | 8.219E−02 | 1.875E−02 | 1.076E−02 | 3.430E−03 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface |
|---|---|---|---|---|
| k | 0.000E+00 | −6.693E+00 | 0.000E+00 | −5.759E+00 |
| A4 | 3.916E−02 | 3.208E−02 | −1.249E−01 | −7.037E−02 |
| A6 | −3.532E−02 | −1.721E−02 | 3.231E−02 | 2.466E−02 |
| A8 | 1.142E−02 | 5.612E−03 | −2.817E−03 | −6.182E−03 |
| A10 | −2.645E−03 | −1.128E−03 | 8.737E−05 | 1.036E−03 |
| A12 | 2.651E−04 | 1.326E−04 | −2.188E−05 | −1.112E−04 |
| A14 | 0.000E+00 | −7.226E−06 | 4.143E−06 | 6.733E−06 |
| A16 | 0.000E+00 | 0.000E+00 | −2.108E−07 | −1.706E−07 |

As shown in Table 10, the imaging lens in Example 7 satisfies the conditional expressions (1) to (13).

Figure 14:
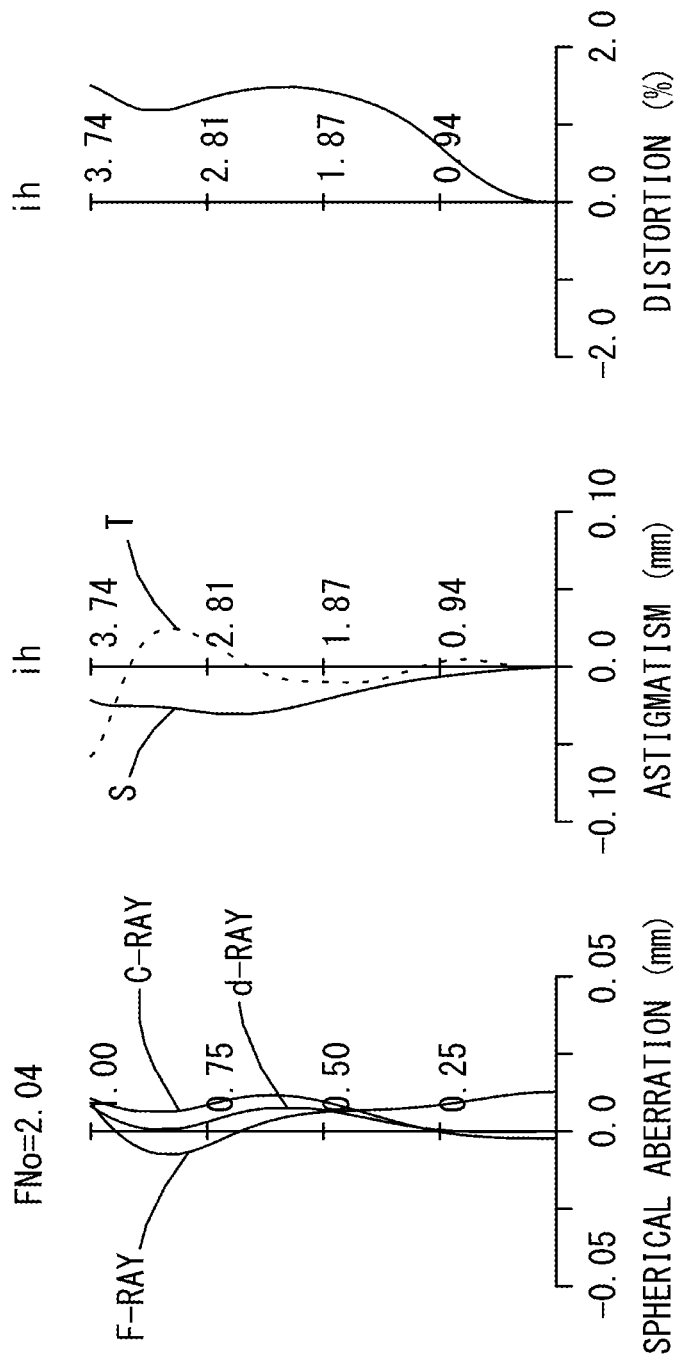
FIG. 14 shows spherical aberration, astigmatism, and distortion of the imaging lens in Example 7.
Figure 15:
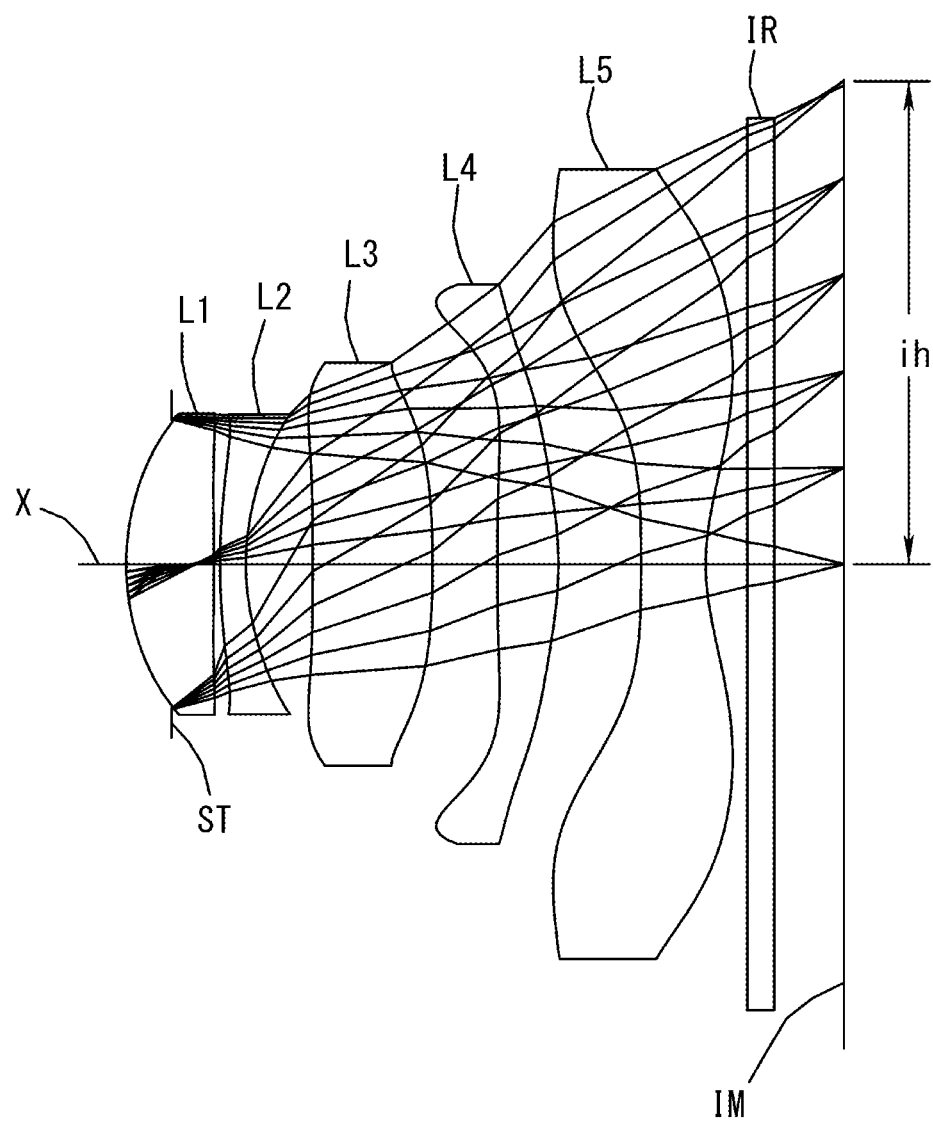
FIG. 15 is a schematic view showing the general configuration of an imaging lens in Example 8.

FIG. 14 shows spherical aberration (mm), astigmatism (mm), and distortion (%) of the imaging lens in Example 7. As shown in FIG. 14, each aberration is corrected properly.

The ratio of total track length TTL to maximum image height ih (TTL/2ih) is 0.73, suggesting that the imaging lens is low-profile. Also, the imaging lens provides high brightness with an F-value of 2.0 and a wide imaging field of view of about 78 degrees.

Example 8

The basic lens data of Example 8 is shown in Table 8 below.

TABLE 8

Example 8
in mm
f = 4.564
Fno = 2.04
ω(°) = 39.0
ih = 3.744

Surface Data

| Surface No. i | Curvature Radius r | Surface Distance d | Refractive Index Nd | Abbe Number vd |
|---|---|---|---|---|
| (Object Surface) | Infinity | Infinity | | |
| 1(Stop) | Infinity | −0.350 | | |
| 2* | 1.974 | 0.678 | 1.5438 | 55.57 |
| 3* | −18.690 | 0.047 | | |
| 4* | 4.428 | 0.200 | 1.6349 | 23.97 |
| 5* | 1.859 | 0.517 | | |
| 6* | −100.000 | 0.928 | 1.5346 | 56.16 |
| 7* | −7.929 | 0.502 | | |
| 8* | 100.000 | 0.472 | 1.5348 | 55.66 |
| 9* | −2.627 | 0.640 | | |
| 10* | −19.347 | 0.500 | 1.5348 | 55.66 |
| 11* | 1.831 | 0.320 | | |
| 12 | Infinity | 0.210 | 1.5168 | 64.20 |
| 13 | Infinity | 0.539 | | |
| Image Plane | Infinity | | | |

Constituent Lens Data

| Lens | Start Surface | Focal Length |
|---|---|---|
| 1 | 2 | 3.322 |
| 2 | 4 | −5.204 |
| 3 | 6 | 16.052 |
| 4 | 8 | 4.794 |
| 5 | 10 | −3.102 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | 1.276E−02 | 4.460E−02 | −7.848E−02 | −1.204E−01 | −4.331E−02 | −2.657E−02 |
| A6 | −1.594E−02 | −1.045E−02 | 1.105E−01 | 1.439E−01 | 2.981E−02 | −4.301E−02 |
| A8 | 2.426E−02 | 1.024E−02 | −7.858E−02 | −9.147E−02 | −2.204E−02 | 3.807E−02 |
| A10 | −1.102E−02 | −1.506E−02 | 2.344E−03 | 1.578E−02 | 1.600E−02 | −1.549E−02 |
| A12 | 1.995E−03 | 3.036E−03 | 5.327E−03 | 5.310E−03 | −3.175E−03 | 2.902E−03 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface |
|---|---|---|---|---|
| k | 0.000E+00 | −5.889E+00 | 0.000E+00 | −5.988E+00 |
| A4 | 6.450E−02 | 8.477E−02 | −8.449E−02 | −6.577E−02 |
| A6 | −7.237E−02 | −5.589E−02 | −2.308E−04 | 1.938E−02 |
| A8 | 2.540E−02 | 1.184E−02 | 1.087E−02 | −4.166E−03 |
| A10 | −5.678E−03 | 1.365E−04 | −3.076E−03 | 6.213E−04 |
| A12 | 5.955E−04 | −3.111E−04 | 3.908E−04 | −6.324E−05 |
| A14 | 0.000E+00 | 2.591E−05 | −2.455E−05 | 3.857E−06 |
| A16 | 0.000E+00 | 0.000E+00 | 6.199E−07 | −1.014E−07 |

As shown in Table 10, the imaging lens in Example 8 satisfies the conditional expressions (1) to (13).

Figure 16:
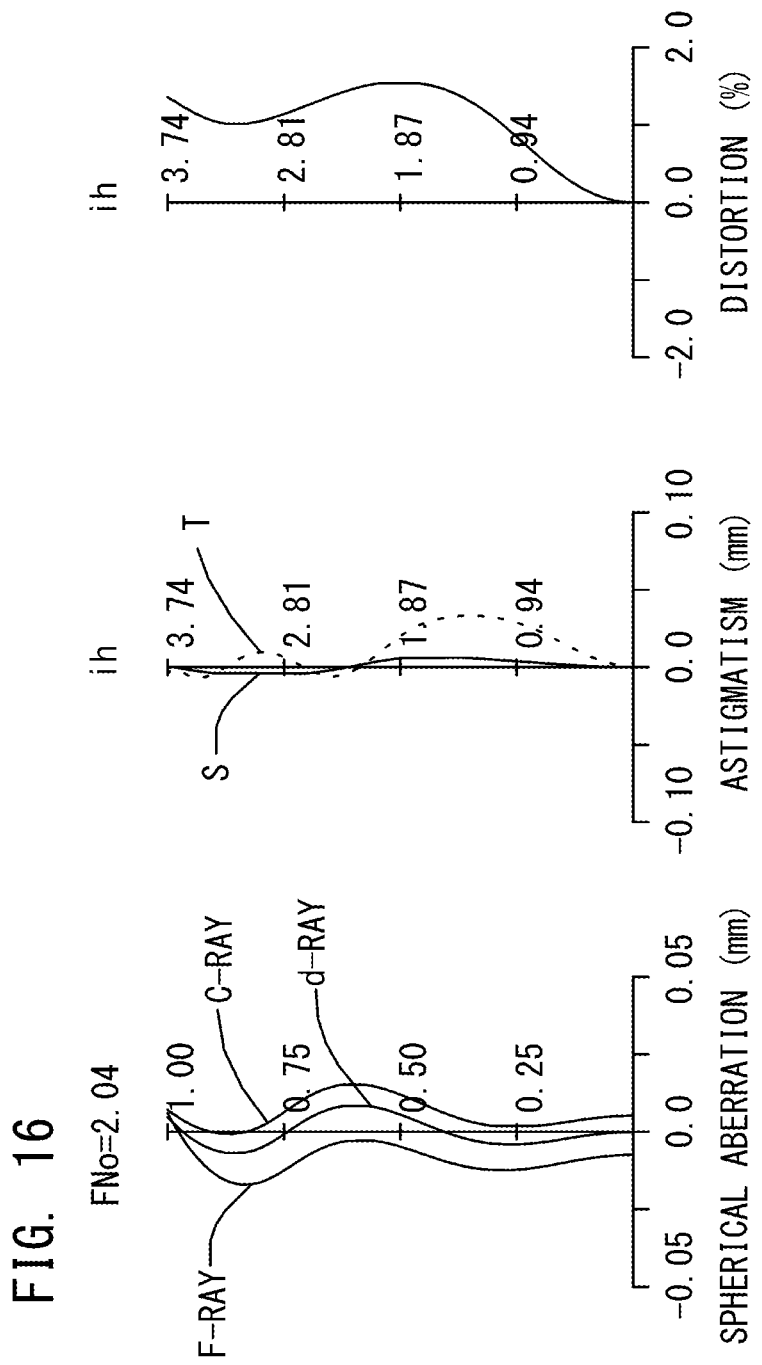
FIG. 16 shows spherical aberration, astigmatism, and distortion of the imaging lens in Example 8.
Figure 17:
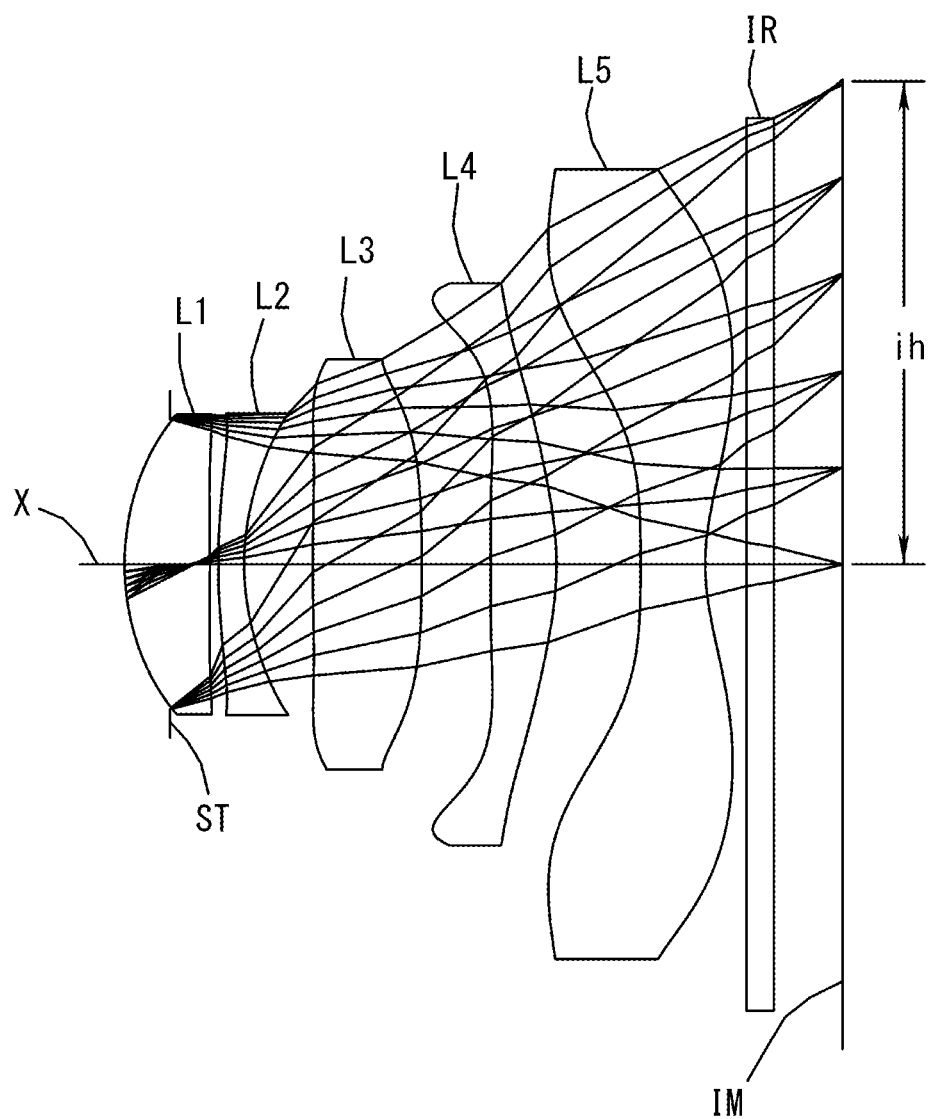
FIG. 17 is a schematic view showing the general configuration of an imaging lens in Example 9.

FIG. 16 shows spherical aberration (mm), astigmatism (mm), and distortion (%) of the imaging lens in Example 8. As shown in FIG. 16, each aberration is corrected properly.

The ratio of total track length TTL to maximum image height ih (TTL/2ih) is 0.73, suggesting that the imaging lens is low-profile. Also, the imaging lens provides high brightness with an F-value of 2.0 and a wide imaging field of view of about 78 degrees.

Example 9

The basic lens data of Example 9 is shown in Table 9 below.

As shown in Table 10, the imaging lens in Example 9 satisfies the conditional expressions (1) to (13).

Figure 18:
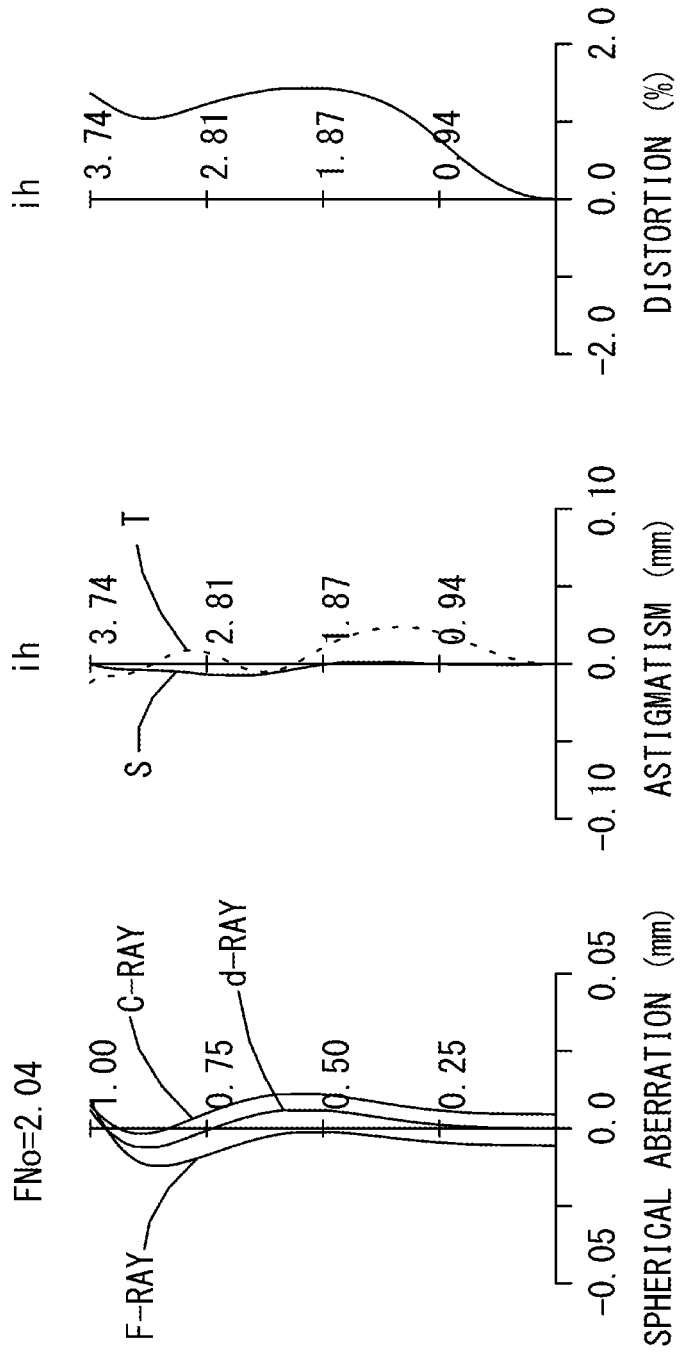
FIG. 18 shows spherical aberration, astigmatism, and distortion of the imaging lens in Example 9.

FIG. 18 shows spherical aberration (mm), astigmatism (mm), and distortion (%) of the imaging lens in Example 9. As shown in FIG. 18, each aberration is corrected properly.

The ratio of total track length TTL to maximum image height ih (TTL/2ih) is 0.73, suggesting that the imaging lens is low-profile. Also, the imaging lens provides high brightness with an F-value of 2.0 and a wide imaging field of view of about 78 degrees.

As explained above, the imaging lens according to the preferred embodiment of the present invention provides a compact high-resolution optical system which has a ratio of total track length TTL to maximum image height ih (TTL/

TABLE 9

Example 9
in mm
f = 4.564
Fno = 2.04
ω(°) = 39.0
ih = 3.744

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.350 | | |
| 2* | 1.984 | 0.660 | 1.5438 | 55.57 |
| 3* | −26.272 | 0.064 | | |
| 4* | 4.609 | 0.200 | 1.6349 | 23.97 |
| 5* | 1.854 | 0.533 | | |
| 6* | 17.177 | 0.842 | 1.5348 | 55.66 |
| 7* | −14.223 | 0.533 | | |
| 8* | 100.000 | 0.509 | 1.5348 | 55.66 |
| 9* | −2.431 | 0.651 | | |
| 10* | −16.367 | 0.500 | 1.5348 | 55.66 |
| 11* | 1.800 | 0.320 | | |
| 12 | Infinity | 0.210 | 1.5168 | 64.20 |
| 13 | Infinity | 0.532 | | |
| Image Plane | Infinity | | | |

Constituent Lens Data

| Lens | Start Surface | Focal Length |
|---|---|---|
| 1 | 2 | 3.420 |
| 2 | 4 | −5.027 |
| 3 | 6 | 14.685 |
| 4 | 8 | 4.445 |
| 5 | 10 | −3.003 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | 9.373E−03 | 2.497E−02 | −1.037E−01 | −1.312E−01 | −4.321E−02 | −3.338E−02 |
| A6 | −9.140E−03 | 2.119E−02 | 1.643E−01 | 1.696E−01 | 2.798E−02 | −2.933E−02 |
| A8 | 1.778E−02 | −1.839E−02 | −1.476E−01 | −1.285E−01 | −2.110E−02 | 2.487E−02 |
| A10 | −8.929E−03 | −6.421E−04 | 5.170E−02 | 4.250E−02 | 1.253E−02 | −1.085E−02 |
| A12 | 2.285E−03 | 1.041E−03 | −7.764E−03 | −2.368E−03 | −2.199E−03 | 2.199E−03 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface |
|---|---|---|---|---|
| k | 0.000E+00 | −5.419E+00 | 0.000E+00 | −6.142E+00 |
| A4 | 4.173E−02 | 5.114E−02 | −1.000E−01 | −6.715E−02 |
| A6 | −4.588E−02 | −3.014E−02 | 1.388E−02 | 2.141E−02 |
| A8 | 1.638E−02 | 7.383E−03 | 5.371E−03 | −4.918E−03 |
| A10 | −4.309E−03 | −4.408E−04 | −1.929E−03 | 7.725E−04 |
| A12 | 5.012E−04 | −7.650E−05 | 2.569E−04 | −8.051E−05 |
| A14 | 0.000E+00 | 8.375E−06 | −1.628E−05 | 4.862E−06 |
| A16 | 0.000E+00 | 0.000E+00 | 4.087E−07 | −1.240E−07 |

2ih) of 0.75 or less and offers high brightness with an F-value of 2.4 or less and a wide imaging field of view of about 80 degrees and corrects various aberrations properly.

Table 10 shows data on Examples 1 to 9 in relation to the conditional expressions (1) to (13).

TABLE 10

|  | Example 1 | Example 2 | Example 3 | Example 4 | Example 5 | Example 6 | Example 7 | Example 8 | Example 9 |
| --- | --- | --- | --- | --- | --- | --- | --- | --- | --- |
| Conditional Expression (1) ih/f | 0.85 | 0.85 | 0.85 | 0.82 | 0.82 | 0.82 | 0.82 | 0.82 | 0.82 |
| Conditional Expression (2) TTL/2ih | 0.71 | 0.71 | 0.71 | 0.73 | 0.73 | 0.73 | 0.73 | 0.73 | 0.73 |
| Conditional Expression (3) f3/f | 8.48 | 4.00 | 8.64 | 4.34 | 3.42 | 2.97 | 5.16 | 3.52 | 3.22 |
| Conditional Expression (4) f1/f4 | 1.10 | 1.15 | 1.10 | 1.02 | 1.06 | 0.82 | 0.69 | 0.69 | 0.77 |
| Conditional Expression (5) f1/f | 0.73 | 0.75 | 0.74 | 0.81 | 0.82 | 0.77 | 0.61 | 0.73 | 0.75 |
| Conditional Expression (6) f2/f | −1.12 | −1.13 | −1.13 | −1.37 | −1.32 | −1.14 | −0.83 | −1.14 | −1.10 |
| Conditional Expression (7) vd1 − vd2 | 31.60 | 31.60 | 31.60 | 31.60 | 31.60 | 31.60 | 31.60 | 31.60 | 31.60 |
| Conditional Expression (8) fs/f | −0.57 | −0.54 | −0.58 | −0.57 | −0.57 | −0.63 | −0.64 | −0.68 | −0.66 |
| Conditional Expression (9) (r1 + r2)/(r1 − r2) | −0.81 | −0.96 | −0.82 | −1.13 | −1.07 | −0.91 | −0.47 | −0.81 | −0.86 |
| Conditional Expression (10) (r3 + r4)/(r3 − r4) | 1.75 | 2.09 | 1.85 | 2.49 | 2.31 | 2.38 | 0.95 | 2.45 | 2.35 |
| Conditional Expression (11) (r7 + r8)/(r7 − r8) | 1.38 | 1.50 | 1.42 | 0.94 | 1.13 | 0.95 | 0.93 | 0.95 | 0.95 |
| Conditional Expression (12) (r9 + r10)/(r9 − r10) | 0.83 | 0.84 | 0.82 | 0.73 | 0.73 | 0.74 | 1.03 | 0.83 | 0.80 |
| Conditional Expression (13) d2/f | 0.04 | 0.04 | 0.04 | 0.04 | 0.05 | 0.04 | 0.04 | 0.04 | 0.04 |

When the imaging lens composed of five constituent lenses according to the present invention is used in an image pickup device mounted in an increasingly compact and low-profile smart phone, mobile terminal, game console or information terminal such as a PC, or a home appliance with a camera function, the camera concerned provides a wide field of view and delivers high performance.

The effects of the present invention are as follows.

According to the present invention, there is provided a compact high-resolution imaging lens which meets the demand for low-profileness, offers high brightness with an F-value of 2.4 or less and a wide field of view and corrects various aberrations properly.

What is claimed is:

1. An imaging lens which forms an image of an object on a solid-state image sensor, in which an F-value is 2.4 or less and elements are arranged in order from an object side to an image side, comprising:
    a first lens with positive refractive power having a convex surface on the object side;
    a second lens with negative refractive power having a concave surface near an optical axis on the image side;
    a third lens with positive refractive power as a double-sided aspheric lens;
    a fourth lens with positive refractive power having a convex surface on the image side; and
    a fifth lens with negative refractive power as a double-sided aspheric lens having a concave surface on the image side, wherein
    the image-side surface of the fifth lens has pole-change points off the optical axis; and conditional expressions (1), (2), (3), (4) and (10) below are satisfied:

$$0.80 < ih/f < 1.00 \quad (1)$$

$$0.6 < TTL/2ih < 0.75 \quad (2)$$

$$2.3 < f3/f < 10.3 \quad (3)$$

$$0.5 < f1/f4 < 1.4 \quad (4)$$

$$1.75 \leq (r3+r4)/(r3-r4) < 3.0 \quad (10)$$

where
f: focal length of an overall optical system of the imaging lens
f1: focal length of the first lens
f3: focal length of the third lens
f4: focal length of the fourth lens
ih: maximum image height
TTL: distance on the optical axis from the object-side surface of the first lens to an image plane
r3: curvature radius of the object-side surface of the second lens
r4: curvature radius of the image-side surface of the second lens.

2. The imaging lens according to claim 1,
wherein the fourth lens has an aspheric shape in which positive refractive power becomes weaker with increasing distance from the optical axis and changes to negative refractive power in the peripheral portion.

3. The imaging lens according to claim 1,
wherein a conditional expression (5) below is satisfied:

$$0.5 < f1/f < 1.0 \quad (5)$$

where
f: focal length of the overall optical system of the imaging lens
f1: focal length of the first lens.

4. The imaging lens according to claim 1,
wherein a conditional expression (6) below is satisfied:

$$-1.6 < f2/f < -0.6 \quad (6)$$

where
f: focal length of the overall optical system of the imaging lens
f2: focal length of the second lens.

5. The imaging lens according to claim 1,
wherein a conditional expression (7) below is satisfied:

$$25 < vd1 - vd2 < 40 \quad (7)$$

where
vd1: Abbe number of the first lens at d-ray
vd2: Abbe number of the second lens at d-ray.

6. The imaging lens according to claim 1,
wherein a conditional expression (8) below is satisfied:

$$-0.9 < f5/f < -0.4 \quad (8)$$

where
f: focal length of the overall optical system of the imaging lens
f5: focal length of the fifth lens.

7. The imaging lens according to claim 1,
wherein a conditional expression (9) below is satisfied:

$$-1.4 < (r1+r2)/(r1-r2) < -0.3 \quad (9)$$

where
r1: curvature radius of the object-side surface of the first lens
r2: curvature radius of the image-side surface of the first lens.

8. The imaging lens according to claim 1,
wherein a conditional expression (11) below is satisfied:

$$0.7 < (r7+r8)/(r7-r8) < 1.8 \quad (11)$$

where
r7: curvature radius of the object-side surface of the fourth lens
r8: curvature radius of the image-side surface of the fourth lens.

9. The imaging lens according to claim 3,
wherein a conditional expression (9) below is satisfied:

$$-1.4 < (r1+r2)/(r1-r2) < -0.3 \quad (9)$$

where
r1: curvature radius of the object-side surface of the first lens
r2: curvature radius of the image-side surface of the first lens.

10. The imaging lens according to claim 2,
wherein a conditional expression (11) below is satisfied:

$$0.7 < (r7+r8)/(r7-r8) < 1.8 \quad (11)$$

where
r7: curvature radius of the object-side surface of the fourth lens
r8: curvature radius of the image-side surface of the fourth lens.

11. An imaging lens which forms an image of an object on a solid-state image sensor, in which an F-value is 2.4 or less and elements are arranged in order from an object side to an image side, comprising:
a first lens with positive refractive power having a convex surface on the object side;
a second lens with negative refractive power having a concave surface near an optical axis on the image side and a convex surface near the optical axis on the object side;
a third lens with positive refractive power as a double-sided aspheric lens;
a fourth lens with positive refractive power having a convex surface on the image side; and
a fifth lens with negative refractive power as a double-sided aspheric lens having a concave surface on the image side,
wherein the image-side surface of the fifth lens has pole-change points off the optical axis; and
conditional expressions (11), (12), and (13) below are satisfied:

$$0.7 < (r7+r8)/(r7-r8) < 1.8 \quad (11)$$

$$0.55 < (r9+r10)/(r9-r10) < 1.25 \quad (12)$$

$$0.03 < d2/f < 0.06 \quad (13)$$

where
r7: curvature radius of the object-side surface of the fourth lens
r8: curvature radius of the image-side surface of the fourth lens
r9: curvature radius of the object-side surface of the fifth lens
r10: curvature radius of the image-side surface of the fifth lens
f: focal length of the overall optical system
d2: thickness of the second lens on the optical axis.

12. The imaging lens according to claim 11,
wherein a conditional expression (1) below is satisfied:

$$0.80 < ih/f < 1.00 \quad (1)$$

where
f: focal length of an overall optical system of the imaging lens
ih: maximum image height.

13. The imaging lens according to claim 11,
wherein a conditional expression (2) below is satisfied:

$$0.6 < TTL/2ih < 0.75 \quad (2)$$

where
ih: maximum image height
TTL: distance on the optical axis from the object-side surface of the first lens to an image plane.

14. The imaging lens according to claim 11,
wherein a conditional expression (3) below is satisfied:

$$2.3 < f3/f < 10.3 \quad (3)$$

where
f: focal length of an overall optical system of the imaging lens
f3: focal length of the third lens.

15. The imaging lens according to claim 11, wherein a conditional expression (4) below is satisfied:

$$0.5 < f1/f4 < 1.4 \quad (4)$$

where
f1: focal length of the first lens
f4: focal length of the fourth lens.

16. The imaging lens according to claim 11,
wherein a conditional expression (7) below is satisfied:

$$25 < vd1 - vd2 < 40 \quad (7)$$

where
vd1: Abbe number of the first lens at d-ray
vd2: Abbe number of the second lens at d-ray.

17. The imaging lens according to claim 11, wherein a conditional expression (8) below is satisfied:

$$-0.9 < f5/f < -0.4 \quad (8)$$

where f: focal length of the overall optical system of the imaging lens f5: focal length of the fifth lens.

18. The imaging lens according to claim 11, wherein a conditional expression (9) below is satisfied:

$$-1.4 < (r1+r2)/(r1-r2) < -0.3 \quad (9)$$

where r1: curvature radius of the object-side surface of the first lens r2: curvature radius of the image-side surface of the first lens.

* * * * *